(12) United States Patent
Mori et al.

(10) Patent No.: US 7,123,404 B1
(45) Date of Patent: Oct. 17, 2006

(54) OPTICAL AMPLIFIER AND OPTICAL AMPLIFICATION METHOD

(75) Inventors: Shota Mori, Kawasaki (JP); Maki Hiraizumi, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 11/316,921

(22) Filed: Dec. 27, 2005

(30) Foreign Application Priority Data

Sep. 28, 2005 (JP) ............................. 2005-282822

(51) Int. Cl.
*H01S 3/13* (2006.01)
(52) U.S. Cl. ............................. 359/337.11; 359/337.13
(58) Field of Classification Search .......... 359/337.11, 359/337.13, 341.1
See application file for complete search history.

(56) References Cited

U.S. PATENT DOCUMENTS

| | | | |
|---|---|---|---|
| 6,055,092 A | 4/2000 | Sugaya et al. | |
| 6,212,001 B1 | 4/2001 | Bode et al. | |
| 6,369,938 B1 | 4/2002 | Sugaya et al. | |
| 6,400,499 B1 | 6/2002 | Sugaya et al. | |
| 6,480,329 B1 | 11/2002 | Sugaya et al. | |
| 6,529,319 B1* | 3/2003 | Youn et al. | 359/341.41 |
| 6,943,937 B1* | 9/2005 | Lelic et al. | 359/337.11 |
| 6,977,770 B1* | 12/2005 | Komaki et al. | 359/337.11 |
| 2002/0093726 A1 | 7/2002 | Sugaya et al. | |
| 2003/0002140 A1 | 1/2003 | Sugaya et al. | |

FOREIGN PATENT DOCUMENTS

| | | |
|---|---|---|
| JP | HEI 11-220456 | 8/1999 |
| JP | HEI 11-275026 | 10/1999 |
| JP | 2002-368698 | 12/2002 |

* cited by examiner

*Primary Examiner*—Mark Hellner
(74) *Attorney, Agent, or Firm*—Bingham McCutchen LLP

(57) ABSTRACT

An optical amplifier includes an output unit that outputs a loss monitoring light having a wavelength that causes neither absorption nor gain with respect to each of the wavelengths of a light signal to be amplified with EDFs; a multiplexing unit that multiplexes the loss monitoring light with the light signal at an input stage of the light signal; a demultiplexing unit that demultiplexes the loss monitoring light from multiplexed light signal at an output stage of the light signal; a detecting unit that detects intensity of loss monitoring light at the input stage and intensity of loss monitoring light at the output stage; a calculating unit that calculates, based on the intensities, a loss of the loss monitoring light that has occurred between the input stage and the output stage; and a control unit that controls, based on the loss, the variable optical attenuator.

14 Claims, 19 Drawing Sheets

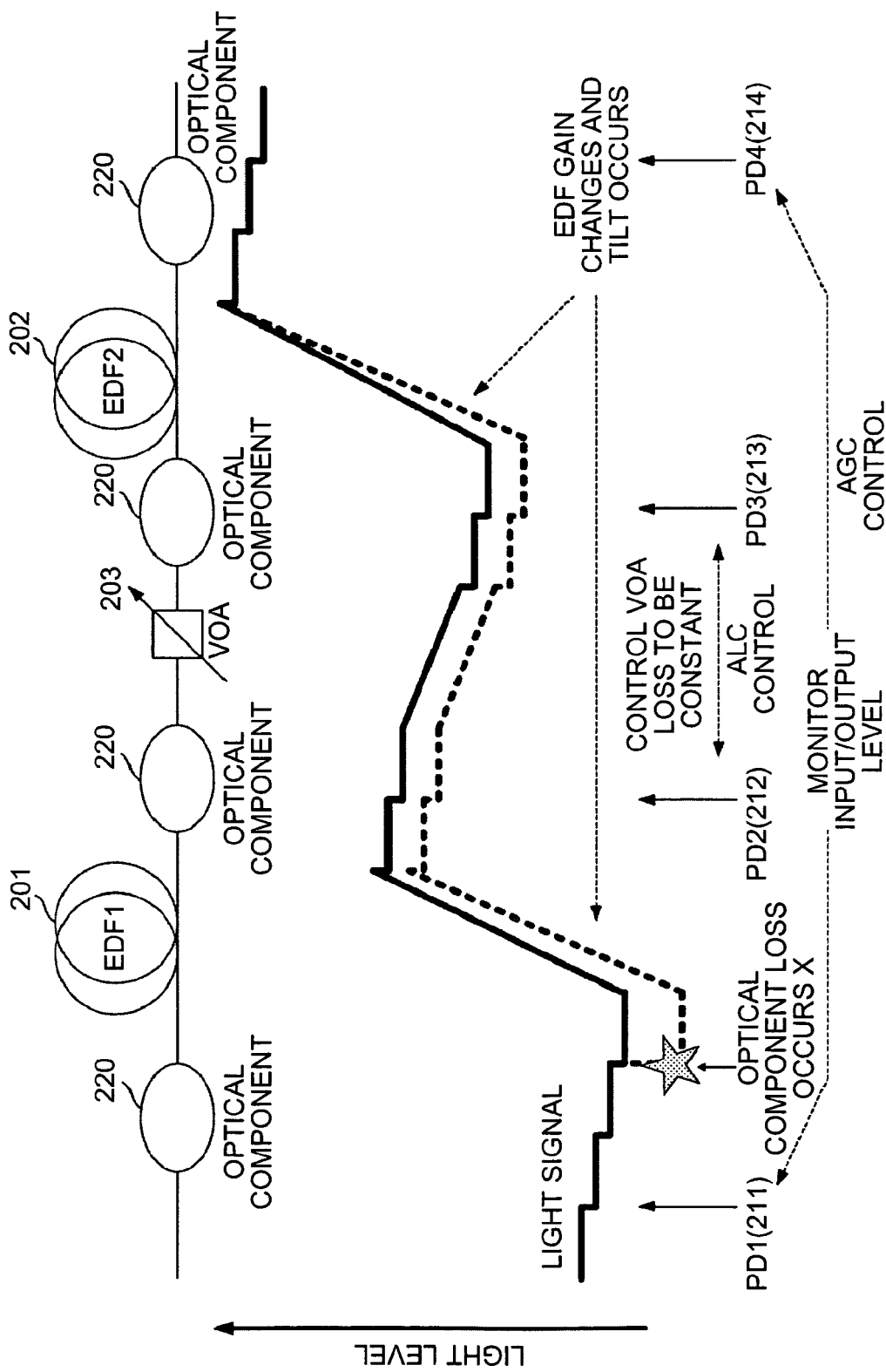

OPTICAL AMPLIFIER AND OPTICAL AMPLIFICATION METHOD

CROSS-REFERENCE TO RELATED APPLICATIONS

This application is based upon and claims the benefit of priority from the prior Japanese Patent Application No. 2005-282822, filed on Sep. 28, 2005, the entire contents of which are incorporated herein by reference.

BACKGROUND OF THE INVENTION

1. Field of the Invention

The present invention relates to a technology for amplifying light of multiple wavelengths in a wavelength division multiplexing (WDM) transmission system.

2. Description of the Related Art

A WDM optical transmission system can remarkably improve a signal transmission capacity by collectively amplifying a plurality of wavelengths using an optical amplifier. An optical amplifier most frequently used is an optical fiber amplifier doped with a rare earth element such as erbium.

Such an optical fiber doped with erbium (herein after, "erbium doped fiber (EDF)") amplifies signal lights in a range of 1.53 micrometers ($\mu$m) to 1.6 $\mu$m with excitation light in a 0.98 $\mu$m or 1.48 $\mu$m band. Wavelength dependency (hereinafter, "tilt") of light signals to be collectively amplified varies according to intensity of the excitation light.

FIG. 18 is a schematic for illustrating the tilt. A horizontal axis represents wavelength and a vertical axis represents power. Inclination of power is called tilt. FIG. 19 is a schematic for illustrating a relation between excitation light and EDF gain. A horizontal axis represents wavelength and an vertical axis represents EDF gain. As shown, the tilt varies according to intensity of the excitation light.

When the excitation light is increased and the EDF gain is increased, a gain on a short wavelength side with higher energy is larger than a gain on a long wavelength side. As a result, power on the short wavelength side is larger than power on the long wavelength side. Thus, the tilt occurs. Since unintended tilt can be a cause of deterioration of a transmission quality, particularly in a long-distance WDM-transmission system, it is necessary to perform gain control to make the tilt flat by an optical amplifier, to transmit all wavelengths with equivalent qualities.

FIG. 20 is a schematic of a conventional optical amplifier. An optical amplifier 200 includes EDFs (an EDF1 and an EDF2) 201 and 202 in two stages and a variable optical attenuator (VOA) 203 provided between the EDFs 201 and 202. The optical amplifier 200 performs a control to make output power constant even when input power fluctuates.

In the EDFs 201 and 202, the tilt changes when intensity of excitation light is changed and gain changes as described above. Thus, a control unit 205 performs automatic gain control (AGC) to make gains of the EDFs 201 and 202 constant. FIG. 21 is a schematic for illustrating a control for keeping tilt constant. When input power of an input to the EDF 201 changes, the control unit 205 performs automatic level control (ALC) for keeping output power of the EDF 202 constant by adjusting an attenuation amount of the VOA 203 while making a gain of the EDF 201 constant.

As shown in FIG. 20, the control unit 205 detects light intensity of WDM signals at input and output points of the optical amplifier 200 using photodiodes (PD) 211 and 214 (PD 1 and PD 4) to perform AGC. The control unit 205 detects light intensity of WDM signals at input and output points of the VOA 203 using PDs 212 and 213 (PD 2 and PD 3) and judges an attenuation amount of the VOA 203 to perform ALC (see, for example, Japanese Patent Application Laid-Open No. 2002-368698).

The optical amplifier 200 shown in FIG. 20 is an aggregate of a large number of optical components such as the EDFs 201 and 202, a dividing unit 220 that performs optical division for the PDs 211 to 214, a gain equalizing filter (not shown), an optical isolator for oscillation prevention, a WDM filter for coupling excitation light, and the VOA 203. Therefore, a gain obtained by the optical amplifier 200 is expressed as:

$$\text{optical amplifier gain} = EDF \text{ gain} - VOA \text{ loss} - \text{optical component loss} \quad (1)$$

The optical component loss indicates a total loss excluding a loss (optical loss) of a part intentionally changed in the VOA 203.

The optical component loss fluctuates (in general, increases) due to aged deterioration and failure of the optical components, vibration impact at the time of transportation, a wind pressure due to forced air cooling, occurrence of a bending loss in a winding portion of an optical fiber due to a change in temperature, and the like.

However, in the conventional technology, the power is monitored by monitoring a main signal (a light signal) on a transmission path. Therefore, when changes, it is impossible to tell whether the change in a gain of the optical amplifier is caused by an optical component loss or a change in an EDF gain. In other words, only a sum of the first term and the third term in Equation 1 is detected.

The control unit 205 judges that gains of the EDFs 201 and 202 are insufficient, and executes feedback control such that an original optical amplifier gain can be secured by increasing excitation power. As a result, since the gains of the EDFs 201 and 202 are changed, unintended tilt occurs. In other words, for example, when an optical component loss increases in the optical amplifier, the control unit 205 misrecognizes the increase as a decrease in a gain, and increases the gain with the AGC function. As a result, unintended tilt occurs.

FIG. 22 is a schematic for illustrating a light level when an optical component loss occurs in the optical amplifier. When an optical component loss occurs in a point X before input of the EDF 1 (201), the PD 1 (211) on the input side does not detect the optical component loss. An amount of loss itself between the PD 2 and PD 3 (212 and 213) for controlling the VOA 203 does not change. Thus, the control unit 205 carries out a control for the VOA 203 while keeping the same attenuation amount as that before occurrence of the optical component loss. Since it is detected that output power in the PD 4 (214) on the output side is insufficient, the control unit 205 judges that a gain is insufficient with the AGC and executes adjustment to increase excitation light and return output power to a set value. In this case, as indicated by a dotted line shown in FIG. 22, in the EDFs 1 and 2 (201 and 202), inclination of a light level is steep according to an increase in a gain. As a result, the EDFs 201 and 202 operate with gains larger than a design value to cause tilt.

The conventional optical amplifier 200 operates on the premise that once the optical amplifier 200 is assembled, a loss of an optical component in the optical amplifier 200 does not change. However, when a loss of an optical component changes significantly after the assembly, a state of tilt changes and a desired optical characteristic is not obtained.

If there is a margin in power of an excitation light source and a gain enough for compensating for the increase in the loss is secured, both AGC and ALC normally operate, and, thus, abnormality due to the loss of the optical component cannot be detected. In other words, even if abnormality occurs in a WDM transmission section for transmitting a WDM signal, the abnormality is not detected in the WDM transmission section. The abnormality is detected after the WDM signal exits the WDM transmission section, for example, in a transponder device connected for each wavelength. Thus, it takes long time until the optical amplifier 200 is recovered from a failure after occurrence of the abnormality.

SUMMARY OF THE INVENTION

It is an object of the present invention to at least solve the problems in the conventional technology.

An optical amplifier according to one aspect of the present invention includes a plurality of optical fibers doped with rare earth and a variable optical attenuator that are arranged on a transmission path of a light signal to be amplified having a plurality of wavelengths. The optical amplifier includes an output unit configured to output a loss monitoring light having a wavelength that causes neither absorption nor gain with respect to each of the wavelengths of the light signal; a multiplexing unit configured to multiplex the loss monitoring light with the light signal at an input stage at which the light signal is input to be amplified into the optical amplifier; a demultiplexing unit configured to demultiplex multiplexed loss monitoring light from multiplexed light signal at an output stage at which amplified light signal is to be output from the optical amplifier; a detecting unit configured to detect intensity of the loss monitoring light at the time of multiplexing with the light signal and intensity of the loss monitoring light demultiplexed from the light signal; a calculating unit configured to calculate, based on the intensities, a loss of the loss monitoring light that has occurred between the input stage and the output stage; and a control unit configured to control, based on the loss, the variable optical attenuator so that an amplification gain for each wavelength of the light signal becomes flat.

An optical amplifier according to another aspect of the present invention is for amplifying a light signal having a plurality of wavelengths. The optical amplifier includes a multiplexing unit configured to multiplex a loss monitoring light with the light signal before the light signal is input into the amplifier, wherein the loss monitoring light is set so as not to cause neither absorption nor gain with respect to each of the wavelengths of the light signal; a plurality of amplifiers. Each of the amplifiers includes a plurality of optical fibers doped with rare earth arranged on a transmission path of the light signal; a variable optical attenuator arranged on the transmission path; a demultiplexing unit configured to demultiplex multiplexed loss monitoring light from the light signal at an output stage at which amplified signal light is to be output from the amplifier; a detecting unit configured to detect intensity of the loss monitoring light at the time of multiplexing with the light signal and intensity of the loss monitoring light demultiplexed from the light signal; a calculating unit configured to calculate, based on the intensities, a loss of the loss monitoring light that has occurred while the loss monitoring light passing through the amplifier; and a control unit configured to control, based on the loss, the variable optical attenuator so that an amplification gain for each wavelength of the light signal becomes flat.

A method according to still another aspect of the present invention is of amplifying a light signal having a plurality of wavelengths, using an amplifier that includes a plurality of optical fibers doped with rare earth and a variable optical attenuator arranged on a transmission path of the light signal. The method includes outputting a loss monitoring light having a wavelength that causes neither absorption nor gain with respect to each of the wavelengths of the light signal; multiplexing the loss monitoring light with the light signal at an input stage at which the light signal is input to be amplified into the optical amplifier; demultiplexing multiplexed loss monitoring light from the light signal at an output stage at which amplified light signal is to be output from the optical amplifier; detecting intensity of the loss monitoring light at the time of multiplexing with the light signal and intensity of the loss monitoring light demultiplexed from the light signal; calculating, based on the intensities, a loss of the loss monitoring light that has occurred between the input stage and the output stage; and controlling, based on the loss, the variable optical attenuator so that an amplification gain for each wavelength of the light signal becomes flat.

A method according to still another aspect of the present invention is of amplifying a light signal having a plurality of wavelengths, using a plurality of amplifiers each of which includes a plurality of optical fibers doped with rare earth and a variable optical attenuator that are arranged on a transmission path of the light signal. The method includes multiplexing a loss monitoring light with the light signal, wherein the loss monitoring light is set so as not to cause neither absorption nor gain with respect to each of the wavelengths of the light signal; inputting the light signal multiplexed with the loss monitoring light into the amplifier; demultiplexing multiplexed loss monitoring light from the light signal at an output stage at which amplified signal light is to be output from the amplifier; detecting intensity of the loss monitoring light at the time of multiplexing with the light signal and intensity of the loss monitoring light demultiplexed from the light signal; calculating, based on the intensities, a loss of the loss monitoring light that has occurred while passing through the amplifier; and controlling, based on the loss, the variable optical attenuator so that an amplification gain for each wavelength of the light signal becomes flat.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 22 is a schematic for illustrating a light level when an optical component loss occurs in the optical amplifier.

DETAILED DESCRIPTION OF THE PREFERRED EMBODIMENTS

Exemplary embodiments of the present invention are explained in detail below with reference to the accompanying drawings. In embodiments of the present invention, a gain of an optical amplifier is controlled using loss monitoring light set to an appropriate wavelength that is not affected by amplification of an EDF and does not affect the amplification unlike an operation wavelength of a transmission path.

Figure 1:
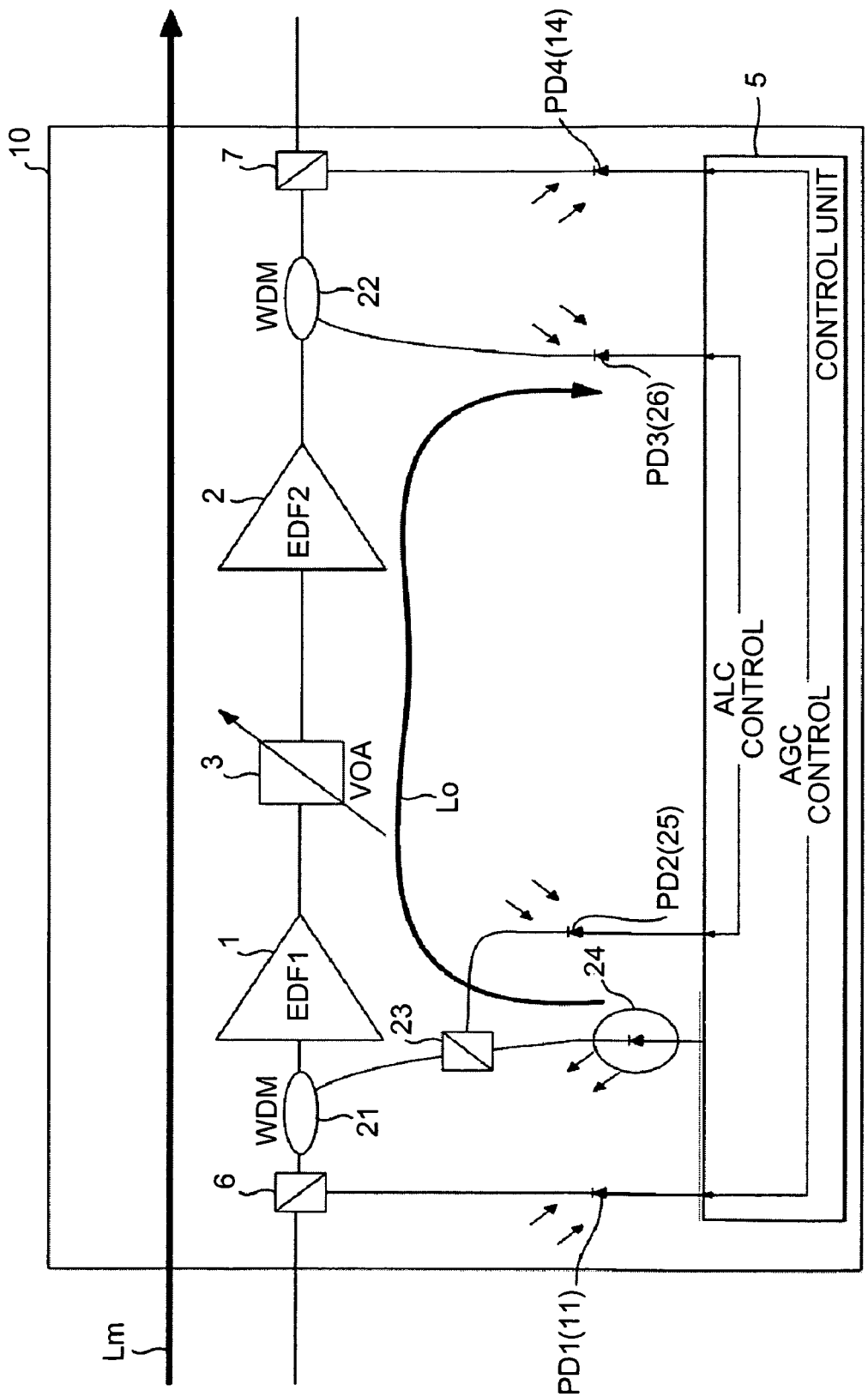
FIG. 1 is a schematic of an optical amplifier according to a first embodiment of the present invention.

FIG. 1 is a schematic of an optical amplifier according to a first embodiment of the present invention. An optical amplifier 10 includes EDFs (an EDF 1 and an EDF 2) 1 and 2 arranged in two stages and a variable optical attenuator (VOA) 3 provided between the EDFs 1 and 2. The optical amplifier 10 performs control to make output power constant even if input power of a main signal (a light signal) Lm of a WDM on a transmission path fluctuates.

In the EDFs 1 and 2, when intensity of excitation light is changed and a gain changes as described above, tilt changes. Thus, a control unit 5 performs AGC to make gains of the EDFs 1 and 2 constant. When input power of input of the light signal Lm to the EDF 1 changes, the control unit 5 performs ALC for keeping output power of the EDF 2 constant by adjusting an attenuation amount of the VOA 3 while making a gain of the EDF 1 constant.

Plural optical components are arranged on a path of the light signal Lm in the inside of the optical amplifier 10. Branching couplers 6 and 7 serving as optical components are provided at a pre-stage and a post-stage of the optical amplifier 10, respectively. The branching coupler 6 branches the light signal Lm at an input point of the optical amplifier 10. A PD 1 (11) serving as an optical detector detects light intensity (power) of the light signal Lm at the input point. The branching coupler 7 multiplexes the light signal Lm at an output point of the optical amplifier 10. A PD 4 (14) detects light intensity of the light signal Lm at the output point. The light intensities of the light signal Lm detected at the input and output points are outputted to the control unit 5.

The control unit 5 performs AGC based on the light intensities of the light signal Lm detected by the PDs 1 and 4 (11 and 14). A WDM coupler 21 is provide at a pre-stage of the EDF 1 and a WDM coupler 22 is provided at a post-stage of the EDF 2 on the transmission path in the inside of the optical amplifier 10. The WDM couplers 21 and 22 are provided as optical components on the path of the light signal Lm and multiplex and demultiplex loss monitoring light Lo with respect to the light signal Lm.

A branching coupler 23 is connected to the WDM coupler 21. A laser diode (LD) for monitoring light 24 that generates and emits the loss monitoring light Lo is connected to one side of the branching coupler 23. A PD for monitoring light (PD 2) 25 that detects the loss monitoring light Lo is connected to the other side of the branching coupler 23. A PD for monitoring light 3 (26) that detects the loss monitoring light Lo is connected to the WDM coupler 22. Light intensities of the loss monitoring light Lo at input and output points of the VOA 3 are detected by the PDs 2 and 3 (25 and 26). The control unit 5 judges an attenuation amount of the VOA 3 and performs ALC according to the light intensities of the loss monitoring light Lo detected by the PDs 2 and 3 (25 and 26).

A wavelength of the loss monitoring light Lo emitted by the LD for monitoring light 24 is set to a wavelength that is not absorbed by the EDFs 1 and 2, which are optical fibers added with rare earth, and does not cause a gain. This makes it possible to directly measure a loss caused in the optical amplifier 10 separately from gains caused by the EDFs 1 and 2.

The loss monitoring light Lo is multiplexed with the main signal (the light signal) Lm of WDM by the WDM coupler 21 at an input stage of the optical amplifier 10 and propagated through optical components including the EDFs 1 and 2 and the VOA 3 together with the light signal Lm. Thereafter, the loss monitoring light Lo is demultiplexed by the WDM coupler 22 at an output stage. The control unit 5 can measure a loss in a path leading from input to output of the optical amplifier 10 including a loss in the VOA 3 from a difference of detection values of the PD 2 (25) that detects power on an input side of only the loss monitoring light Lo and the PD 3 (26) that detects power on an output side.

A value of the measurement is equivalent to measurement of the second term and the third term in Equation 1. When the value is assumed to be a total loss, it is possible to represent an optical amplifier loss by the following Equation 2.

$$\text{optical amplifier gain} = EDF \text{ gain} - \text{total loss} \qquad (2)$$

To make an EDF gain constant and make tilt constant, the control unit 5 controls the value of the total loss to be constant.

Figure 2:
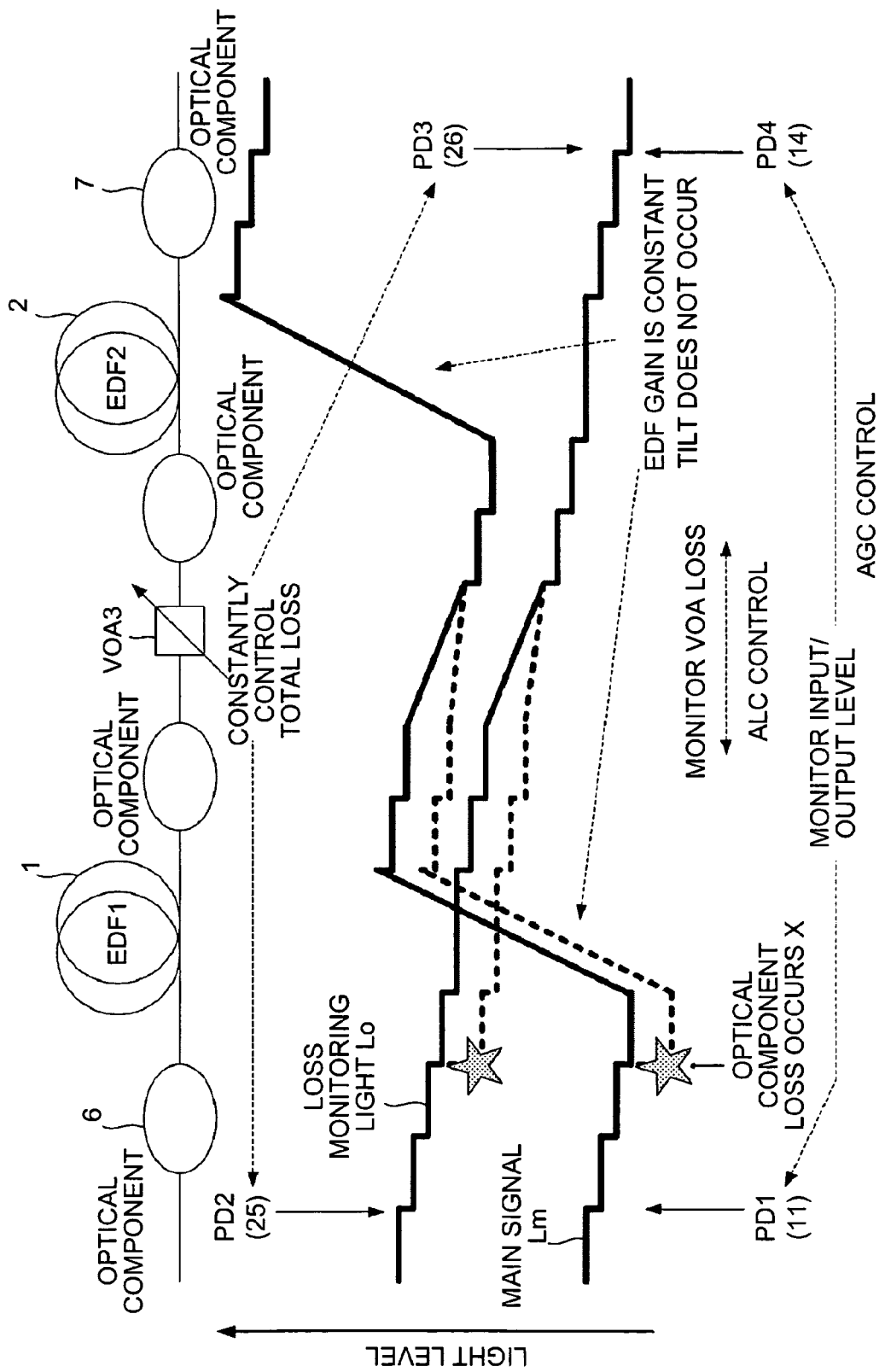
FIG. 2 is a schematic for illustrating a state of a light level when a loss occurs in the optical amplifier.

FIG. 2 is a schematic for illustrating a state of a light level when a loss occurs in the optical amplifier. As in the case of FIG. 22 (the conventional technology), a loss due to the optical components 6 and 7 occurs in a place X behind the PD 1 (11). In this case, a loss also occurs in the place X not only for the light signal Lm but also for the loss monitoring signal Lo.

To detect that an input level of the PD for monitoring light PD 3 (26) falls and the total loss increases, the control unit 5 performs control to decrease a loss of the VOA 3 and return an amount of the total loss to an original value. As a result, since the EDFs 1 and 2 operate with the same gains as before the occurrence of the loss, tilt is kept constant.

The optical fiber added with rare earth used in the EDFs 1 and 2 has a wavelength to be absorbed and a wavelength at which a gain is obtained according to an energy level peculiar to atoms of the optical fiber. Many researches have been carried out concerning characteristics of the EDFs 1 and 2. As a reference, a graph of an absorption spectrum and gain efficiency of an EDF is shown in page 100 of the non-patent reference 1.

Figure 3:
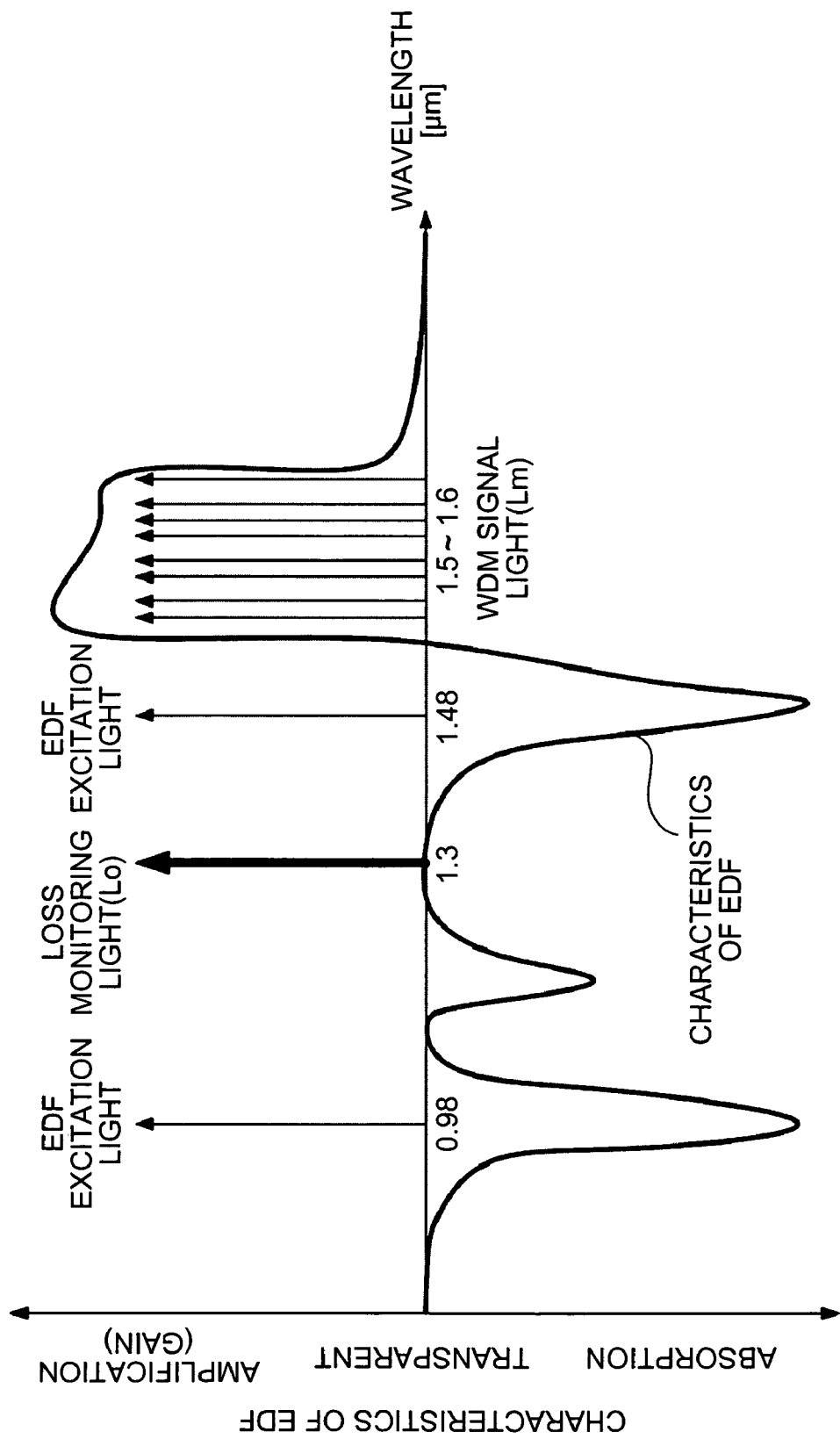
FIG. 3 is a schematic for illustrating characteristics of absorption and gain for each wavelength.

FIG. 3 is a schematic for illustrating characteristics of absorption and gain for each wavelength. According to the reference, wavelengths at which the EDF has a gain are in a wavelength band of 1.5 μm to 1.6 μm. Wavelengths in 0.98 μm and 1.48 μm bands, which are wavelengths to be absorbed, are often used as wavelengths of a light source of an EDF excitation light. On the other hand, there are wavelength bands having neither a gain nor a loss (wavelength bands becoming transparent). As shown in FIG. 3, the wavelength bands having neither a gain nor a loss and becoming transparent are wavelength bands such as 0.6 μm, 0.9 μm, 1.1 μm, and 1.3 μm bands.

As the LD for monitoring light 24 used as a light source for the loss monitoring light Lo, it is easy to use a semiconductor laser that is small, highly efficient, and inexpensive. There are the following wavelength bands for light emitting wavelengths according to a characteristic of semiconductor to be used. As a reference, there is "Semiconductor Laser", Kenichi Iga, Ohmsha Ltd., October 1994.

A 0.8 μm band of an AlGaAs/GaAs system
A 1.0 μm to 1.7 μm band of an AsInAsP/InP system
A 0.98 μm band of an InGaAs/GaAs system Among the wavelength bands, as a wavelength at which the EDF becomes transparent, a 1.3 μm band often used as a light source for communication is most advantageous because the band is easily available and inexpensive. Actually, in a wavelength of 1.31 μm, a result of measurement of a loss of the EDF of about several tens meters indicated 1.1 decibels (including a connector loss in one place), which was almost transparent. Therefore, in the case of the EDF, it is possible to use the wavelength band (1.31 μm) as the loss monitoring light Lo.

An optical fiber amplifier other than the EDF may be used for setting a wavelength band of the loss monitoring light Lo. It is possible to adopt any optical fiber amplifier as long as the optical fiber amplifier satisfies the condition that a wavelength of monitoring light is transparent (has neither a gain nor a loss). For example, it is also possible to use, for example, an optical fiber added with praseodymium having an amplification gain of 1.3 μm.

The optical amplifier 10 shown in FIG. 1 uses the EDFs 1 and 2 at two stages and the VOA 3 at one stage. However, a configuration of the optical amplifier 10 is not limited to this. Even when the number of stages of EDFs and VOAs increases, it is possible to make tilt constant by performing the same control.

In the optical amplifier 10, when a loss occurs in an optical component, the loss is compensated for by reducing a loss of the VOA 3 to make tilt constant without changing gains of the EDFs 1 and 2. It is possible to change tilt by shifting gains of the EDFs 1 and 2 from a value at which tilt is flat by changing the gains.

Figure 4:
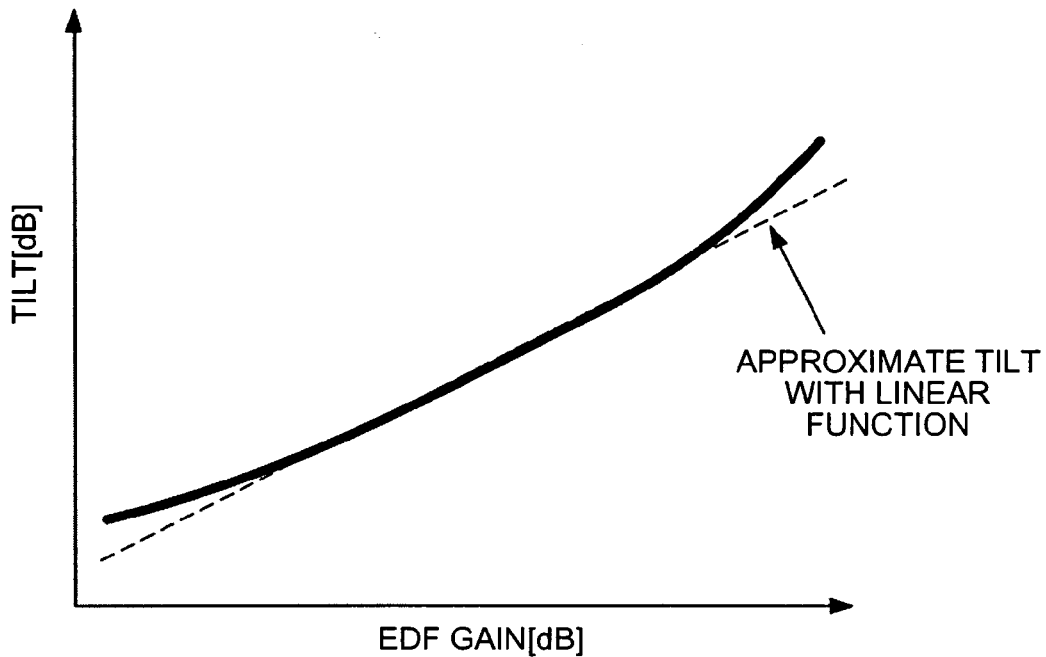
FIG. 4 is a schematic for illustrating a relation between gain and tilt of the EDF.

FIG. 4 is a schematic for illustrating a relation between gain of an EDF and tilt. An abscissa indicates an EDF gain and an ordinate indicates an amount of tilt. A relation between a set value of gains of the EDFs 1 and 2 and a tilt amount can be approximated by a linear function or the like indicated by a dotted line in the figure. A value of a tilt control coefficient is defined by the following Equation 3.

$$\text{tilt control coefficient} = EDF \text{ gain change amount/tilt control amount} \quad (3)$$

When Equation 3 is used, it is possible to calculate an EDF gain set value, with which a required tilt control amount is obtained, using the following Equation 3'.

$$EDF \text{ gain change amount} = \text{tilt control coefficient} \times \text{tilt control amount} \quad (3')$$

When a control method at the time when input and output levels are constant and only tilt is changed, a value of a total loss only has to be changed to make a value of Equation 2 constant. Therefore, it is possible to cause a desired tilt amount according to the following Equation 4.

$$\begin{aligned}\text{optical amplifier gain} &= EDF \text{ gain} - \text{total loss} \\ &= (EDF \text{ gain} + \text{tilt control coefficient} \times \\ &\quad \text{tilt control amount}) - \\ &\quad (\text{total loss} + \text{Tilt control coefficient} \times \\ &\quad \text{tilt control amount})\end{aligned} \quad (4)$$

Figure 5:
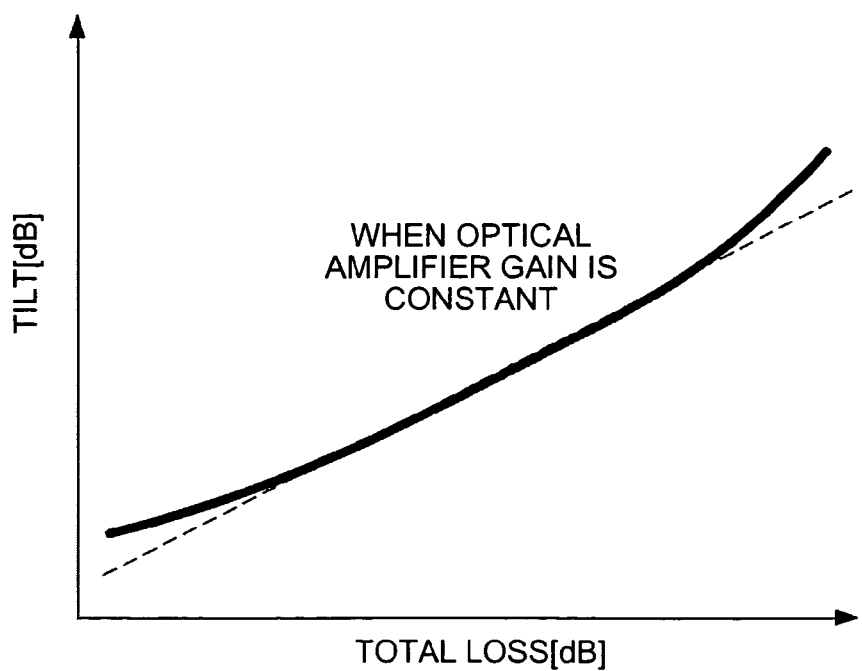
FIG. 5 is a schematic for illustrating a relation between total loss and tilt.

FIG. 5 is a schematic for illustrating a relation between total loss and tilt. An abscissa indicates a total loss and an ordinate indicates an amount of tilt at the time when a gain of the optical amplifier 10 is constant. It is possible to execute control for tilt by changing a target value of the total loss by an amount calculated by the following Equation 5 with respect to a value at the time when tilt is flat.

$$\text{tilt control coefficient} \times \text{tilt control amount} \quad (5)$$

It is also possible to perform, for example, compensation for a wavelength characteristic, which occurs on the transmission path side, by causing tilt in this way.

When a loss occurs in the optical component 6, 7, 21, 22, or the like, the control unit 5 of the optical amplifier 10 shown in FIG. 1 compensates for the loss by decreasing a loss of the VOA 3 and performs control for not changing gains of the EDFs 1 and 2. Since the loss of the VOA 3 has a minimum value, a value that can compensate for the loss of the optical component 6, 7, 21, 22, or the like is finite.

Therefore, for example, when a loss value of the optical component 6 is too large and it is impossible to control a total loss to a fixed value even if the loss of the VOA 3 is reduced to the minimum value, the control unit 5 gives the alarm to inform abnormality of tilt. Consequently, it is possible to warn the outside of failure of the optical amplifier 10 and inform that the alarm is an alarm based on the large loss value of the optical component 6, 7, 21, 22, or the like. This makes it possible to realize prompt restoration of the optical amplifier 10.

Examples of factors that change a value of the VOA3 include the following other than the increase in a loss of the optical component 6, 7, 21, 22, or the like.

1. Fluctuation in a loss at the time of shipment of a product for each optical amplifier 10 due to fluctuation in a loss of an individual component 2. Fluctuation in an input level due to fluctuation in a loss of an optical transmission path 3. Change of an output set value 4. Change of a tilt set value.

As a method of setting a threshold value for giving the alarm, there are several patterns as indicated by A to C below according to which of the fluctuation factors is left as a margin. It is possible to select a pattern according to an idea for safety of the device.

A. A Pattern for Giving the Alarm when a Difference from a Value at the Time of Shipment of a Product Exceeds a Fixed Value In this case, a set value of the VOA 3 at the time when values of 2 to 4 described above are set to certain fixed values at the time of shipment of a product are stored in a nonvolatile memory or the like in the control unit 5. In an actual operation state, the set value of the VOA 3 changes according to the changes of 2 to 4. The control unit 5 compares a value obtained by adding a value for control of 2 to 4 to the value at the time of shipment of a product stored in the nonvolatile memory and the present set value of the VOA 3. When a difference between the values exceeds a certain threshold value, the control unit 5 gives the alarm.

B. A Pattern for Giving the Alarm in a State in which Margins for 2 to 4 is Left A control unit 15 calculates a loss amount of the VOA 3 that fluctuates when maximum control is performed to reduce a loss of the VOA 3 according to control of 2 to 4 from a present control state. When a value of the loss amount is below an amount of a difference from a set value at which the VOA 3 is fully opened, the control unit 15 gives the alarm.

C. A Pattern for Monitoring a Margin Amount for a Full Open State of the VOA 3

In this pattern, without taking into account changes of values of 2 to 4, the control unit 15 monitors a margin amount until the VOA 3 is fully opened in a present operation state. When the margin amount is below a fixed value, the control unit 15 gives the alarm.

In the pattern A, since an amount of deterioration from the time of shipment of a product is set as a threshold value, the setting method is the safest but it tends to be judged that failure has occurred in the optical amplifier 10. On the other hand, in the pattern C, since a margin in a present state is checked, it is possible to use the optical amplifier 10 as long as the characteristic of the optical amplifier 10 is guaranteed. However, there is a disadvantage that, when the fluctuation factors of 2 to 4 occur, it is impossible to compensate for a loss due to the VOA 3 and it is likely that signal deterioration occurs. The pattern B is in the middle between the pattern A and the pattern C. Note that, when a set value does not change dynamically, the factors 3 and 4 may be excluded from the margin.

Figure 6:
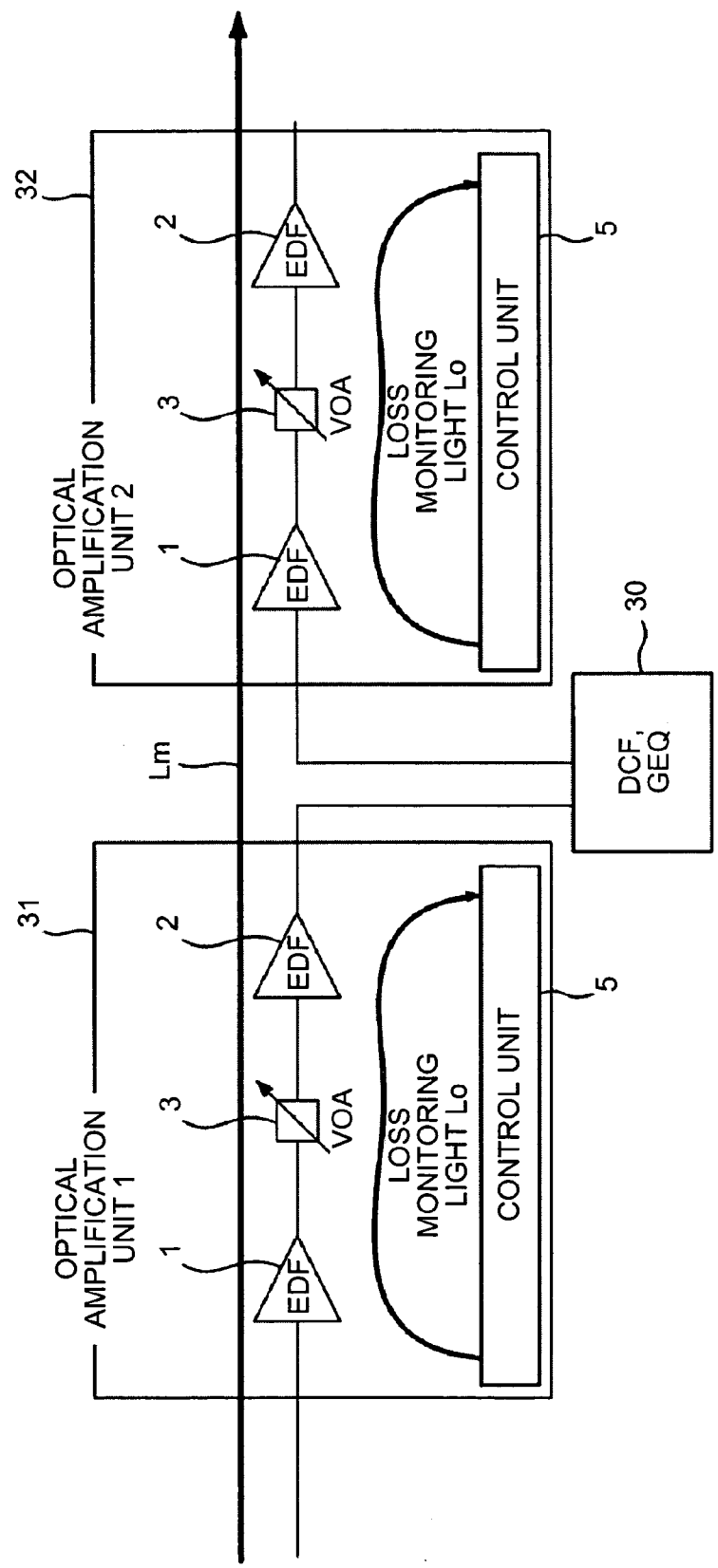
FIG. 6 is a schematic for illustrating tandem connection of optical amplifiers.

FIG. 6 is a schematic for illustrating tandem connection of a plurality of optical amplifiers. When an optical amplifier for amplifying WDM light uses optical components 30 like a dispersion compensating optical fiber (DCF) and a gain equalizer (GEQ), a plurality of optical amplification units 31 and 32 may be provided and connected in tandem across the optical components 30. The optical amplification units 31 and 32 are the same as the optical amplifier 10 shown in FIG. 1.

When it is desired to control optical output of the optical amplification unit 1 (31) and optical output of the optical amplification unit 2 (32) to fixed values independently from each other or when it is necessary to make the optical amplification units replaceable individually to see on which side abnormality occurs, the control units 5 provided in the optical amplification units 1 and 2 (31 and 32) only have to monitor losses, respectively.

The optical amplifier 10 explained with reference to FIG. 1 detects an optical output of a monitoring light source, which is emitted by the LD for monitoring light 24, using the PD for monitoring light 25. However, it is also possible to detect the optical output using an output of a back power monitor of the LD for monitoring light 24. In this case, it is possible to make the PD for monitoring light 25 and the branching coupler 23 unnecessary, reduce the number of optical components, and realize a reduction in cost.

According to the first embodiment explained above, even if a fluctuation in a loss of an optical component provided in an optical amplifier using an optical fiber added with rare earth such as an EDF occurs, it is possible to prevent an excitation state from deviating from a design value to spoil wavelength dependency of a gain. It is possible to provide a high-quality and highly stable WDM optical transmission system by using the optical amplifier.

It is also possible to perform tilt control for actively changing tilt using a characteristic of the optical amplifier. Thus, even if fluctuation in a loss of an optical component occurs, it is possible to accurately compensate for a loss of the optical amplifier. As a result of control for compensation of a loss, when a target control state cannot be realized, since the alarm is given to the outside, a service person can promptly estimate a fault point. Thus, it is possible to realize a reduction in meant time to repair (MTTR) in a large-scale network.

In the first embodiment, the path of the loss monitoring light Lo is formed only in the inside of the optical amplifier 10. However, it is also possible to apply the path of the loss monitoring light Lo according to the present invention to a configuration for passing the loss monitoring light Lo through the optical amplifier 10 (inputting the loss monitoring light Lo to the optical amplifier 10 from the outside and outputting the loss monitoring light Lo to the outside). In other words, it is also possible to transmit one loss monitoring light Lo among plural devices like repeaters including the optical amplifier 10.

Figure 7:
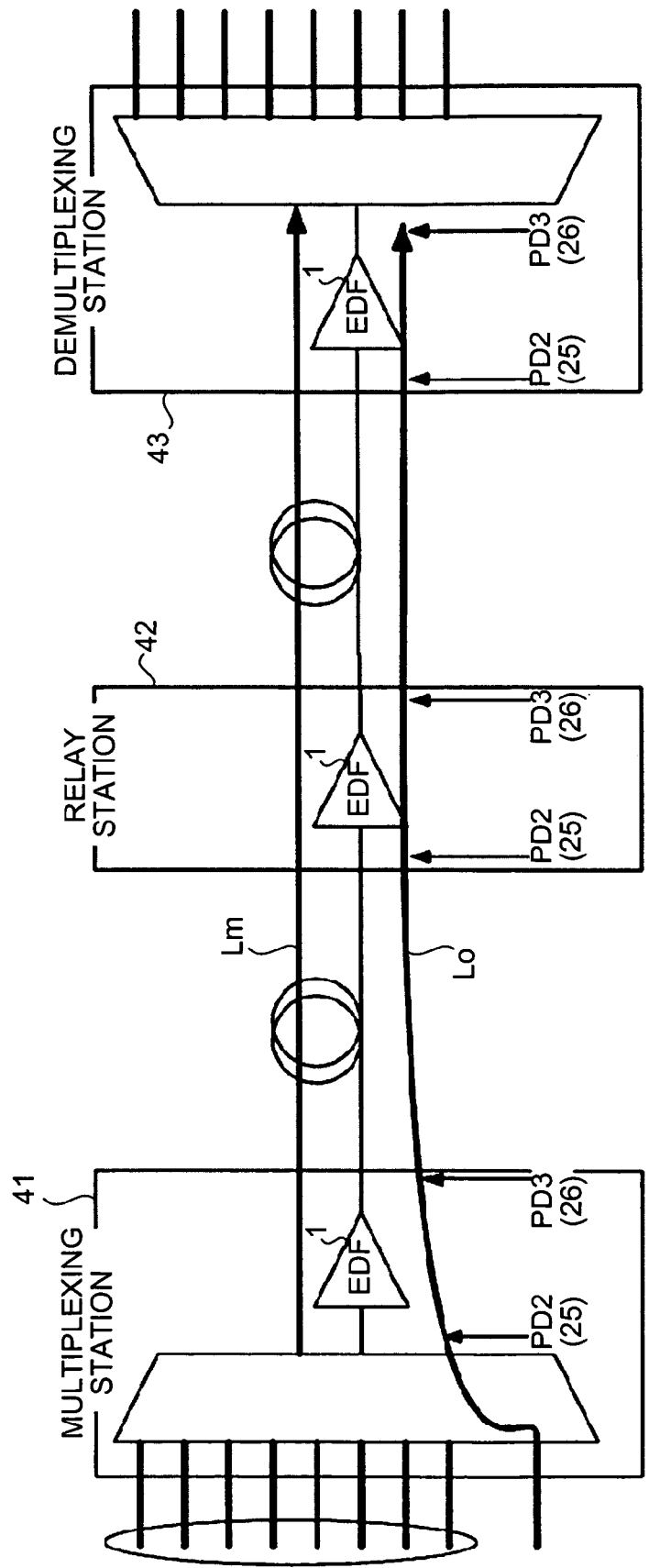
FIG. 7 is a schematic of a configuration with which a main signal is multiplexed with a loss monitoring light.

FIG. 7 is a schematic of a configuration with which a main signal is multiplexed with a loss monitoring light. A multiplexing station 41, a relay station 42, and a demultiplexing station 43 are provided on the transmission path. The multiplexing station 41 multiplexes the loss monitoring light Lo on the main signal (the light signal) Lm and sends the loss monitoring light Lo to the transmission path. In each of the multiplexing station 41, the relay station 42, and the demultiplexing station 43, the EDF 1 that optically amplifies the light signal Lm is provided. In addition, the PDs for monitoring light 2 and 3 (25 and 26) are provided on an input side and an output side of the loss monitoring light Lo to measure a total loss in the inside of the device (see FIG. 1).

Figure 8:
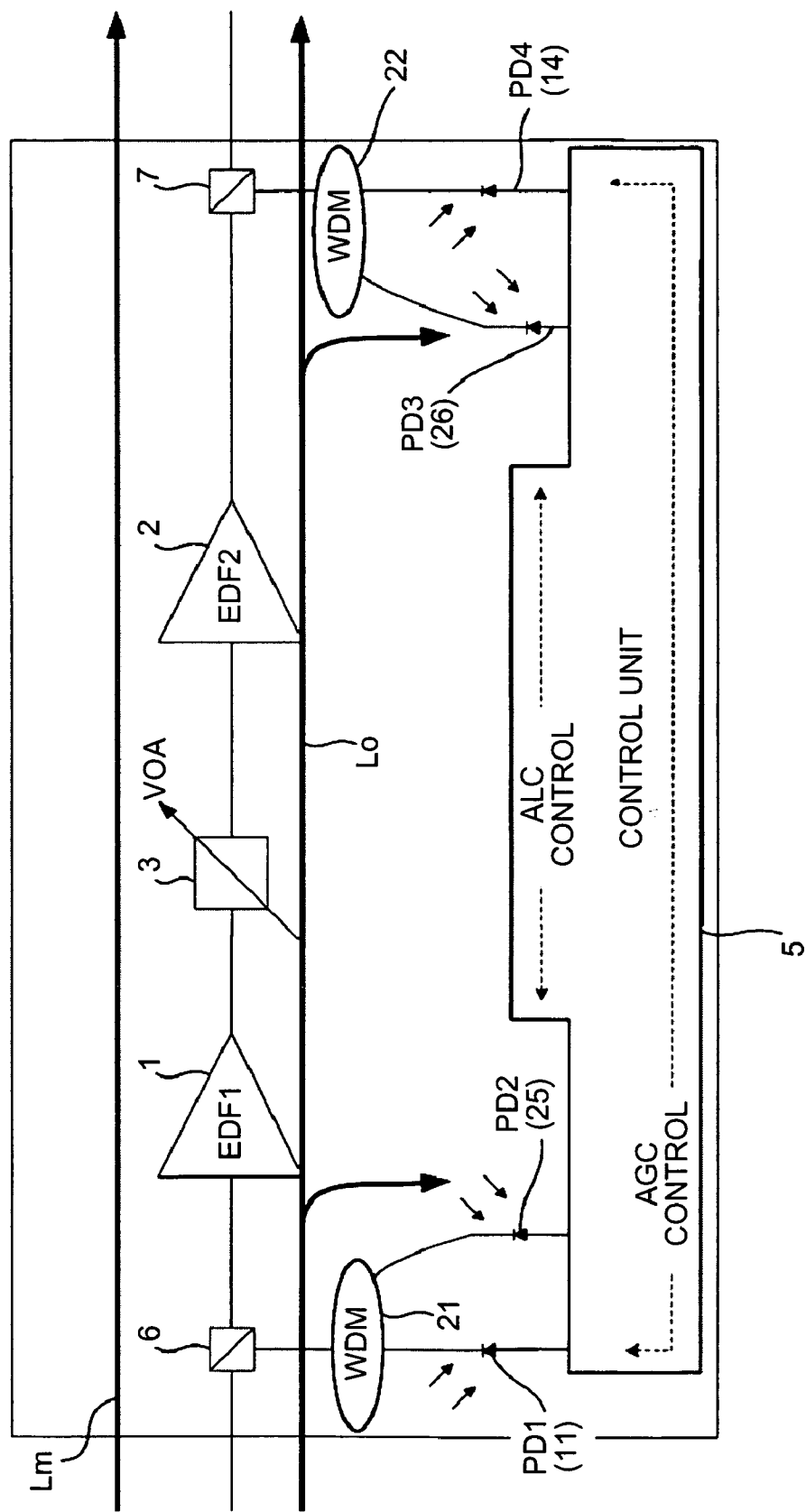
FIG. 8 is a schematic of a device provided on a transmission path of the configuration shown in FIG. 7.

FIG. 8 is a schematic of a device provided on a transmission path of the configuration shown in FIG. 7. In FIG. 8, a configuration related to an optical amplifier in each of the multiplexing station 41, the relay station 42, and the demultiplexing station 43 is extracted and shown. Functions related to the optical amplifier shown in FIG. 8 are the same as those shown in FIG. 1. The identical components are denoted by the identical reference numerals and signs.

The configuration shown in FIG. 8 is different from that shown in FIG. 1 in that the loss monitoring light Lo is multiplexed on the light signal Lm and inputted from the outside. Therefore, in each of the devices, the light signal Lm and the loss monitoring light Lo are partially branched by the optical couplers 6 and 7 in input and output units.

WDM filters 21 and 22 are arranged on a branch output side to demultiplex the light signal Lm and the loss monitoring light Lo.

Light intensities of input and output of the light signal Lm are detected by the PDs 1 and 4 (11 and 14) serving as optical detectors. Light intensities of input and output of the loss monitoring light Lo are detected by the PDs 2 and 3 (25 and 26). As in the first embodiment, the control unit 5 calculates a total loss according to a difference of input and output of the loss monitoring light Lo detected by the PDs 2 and 3 (25 and 26). It is possible to control an amount of loss by the VOA 3 based on the total loss calculated as described in the first embodiment.

In a second embodiment, it is also possible to perform the control for making tilt constant as in the first embodiment. Conversely, control for changing tilt may be performed. Moreover, it is also possible to give the alarm when compensation for a loss reaches a limit.

According to the second embodiment, it is possible to supply the loss monitoring light Lo from a single device to plural devices such as a repeater provided on the transmission path. This makes it unnecessary to provide a light source of the loss monitoring light Lo (the LD for monitoring light 24 shown in FIG. 1) for each of the devices. Thus, it is possible to perform control for compensating for a loss in each of the devices independently while simplifying a configuration of the device and reducing cost of the device.

The loss monitoring light Lo in the configuration described above attenuates as the loss monitoring light Lo propagates through the transmission path. The loss monitoring light Lo also attenuates in the devices (the multiplexing station 41, the repeating station 42, and the demultiplexing station 43 shown in FIG. 7). Therefore, a transmission distance of the loss monitoring light Lo according to the second embodiment depends on sensitivity of the PDs 2 and 3 (25 and 26) that detect the loss monitoring light Lo.

Figure 9:
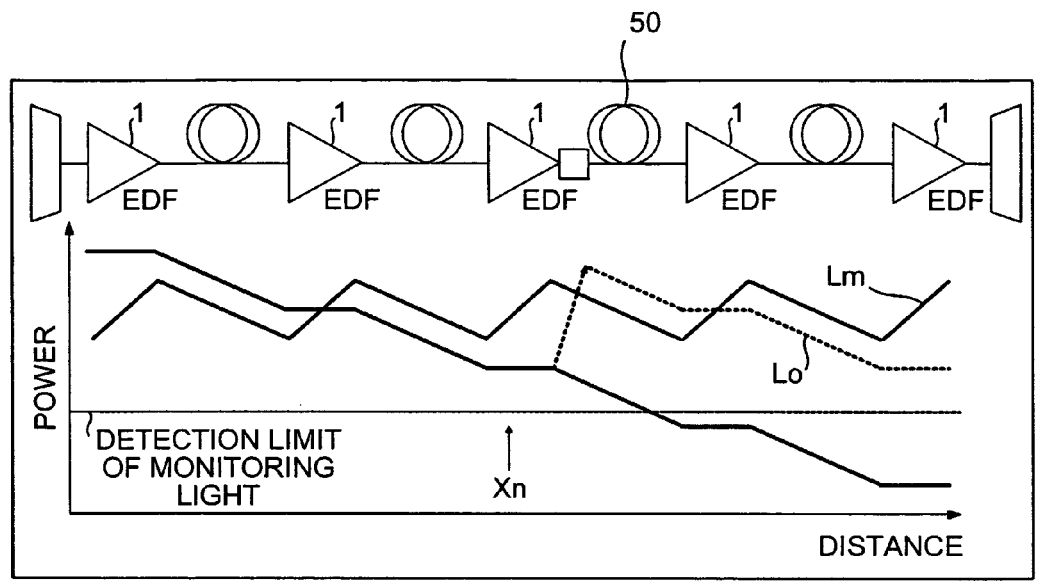
FIG. 9 is a schematic for illustrating amplification of the loss monitoring light.

FIG. 9 is a schematic for illustrating amplification of the loss monitoring light. For convenience of explanation, only the EDFs 1 provided in the optical amplifier 10 are shown as devices on the transmission path. An optical amplifier 50 that amplifies only the loss monitoring light Lo is provided in a place Xn before power of the loss monitoring light Lo reaches a limit of sensitivity of the PDs 2 and 3 (25 and 26, see FIG. 1). By arranging the optical amplifier 50, as indicated by a dotted line in the figure, it is possible to amplify light intensity (power) of the loss monitoring light Lo and extend the transmission distance of the loss monitoring light Lo. When a wavelength of the loss monitoring light Lo is 1.3 μm, as the optical amplifier 50 that amplifies only the loss monitoring light Lo as described above, it is possible to use a semiconductor laser optical amplifier or an optical amplifier added with praseodymium.

When the function for giving the alarm explained in the first embodiment is applied to the second embodiment, in the devices (the repeating station 42 and the like) for which tilt abnormality detection is performed, a loss of an optical component occurs. Thus, power of the loss monitoring light Lo attenuates. Abnormality detection is also performed in devices downstream the transmission path using the loss monitoring light Lo. Thus, in the devices downstream the transmission path, an input level of the loss monitoring light Lo is low and it is impossible to maintain predetermined detection accuracy.

Figure 10:
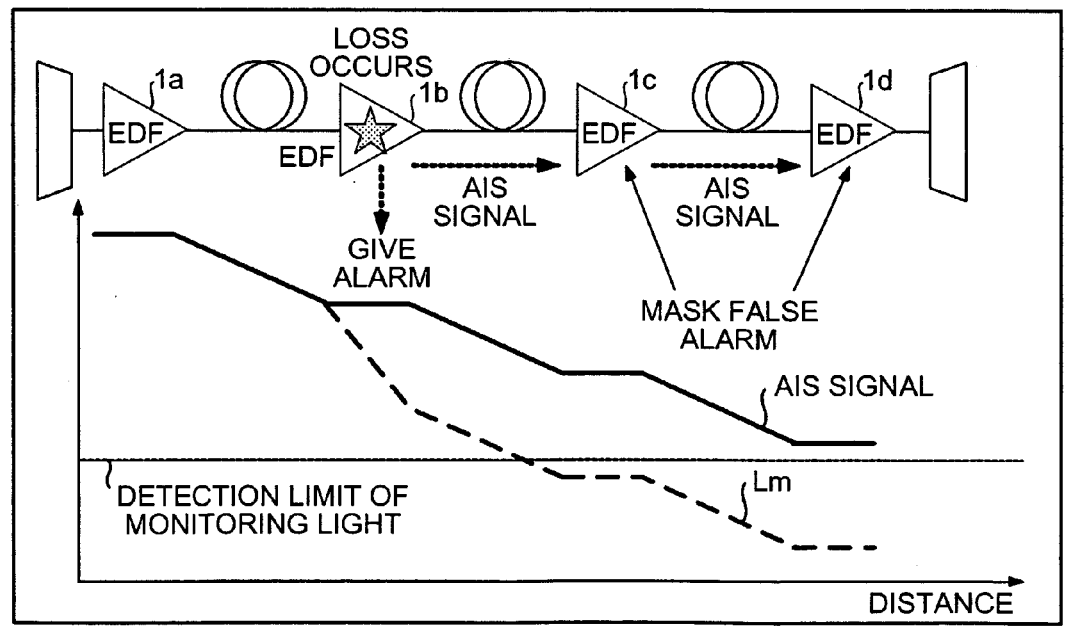
FIG. 10 is a schematic for illustrating transmission of an alarm among more than one device arranged on the transmission path.

FIG. 10 is a schematic for illustrating transmission of an alarm among more than one device arranged on the transmission path. As shown in the figure, the optical amplifier includes means for giving the alarm in a device (a device 1b shown in FIG. 10) in which abnormality (loss) occurs among a plurality of devices 1a to 1d (for convenience of explanation, the devices are described as EDFs) and transmitting the alarm to the downstream devices 1c and 1d using an alarm indication signal (AIS) without using the loss monitoring light Lo. Specifically, the control unit 5 shown in FIG. 1 controls the transmission of the AIS. As means for transmitting the AIS itself on the transmission path, an optical supervisory channel (OSC) for notifying a wavelength number information is conceivable. As a wavelength band of the OSC, for example, there are a 1.51 μm band and a 1.62 μm band.

The downstream devices 1c and 1d having received the AIS transfer the AIS further downstream. In this case, a function for masking the alarm generated by the own device (e.g., the device 1c) is provided in the downstream devices 1c and 1d. This makes it possible to specify the device 1b in which failure has occurred most upstream (the alarm is given).

If it is possible to lower a limit level for detecting the loss monitoring light Lo in the PD for loss monitoring light (the PD 3 (26) shown in FIG. 1), it is possible to make the optical amplifier 50 shown in FIG. 9 unnecessary and extend the transmission distance.

Figure 11:
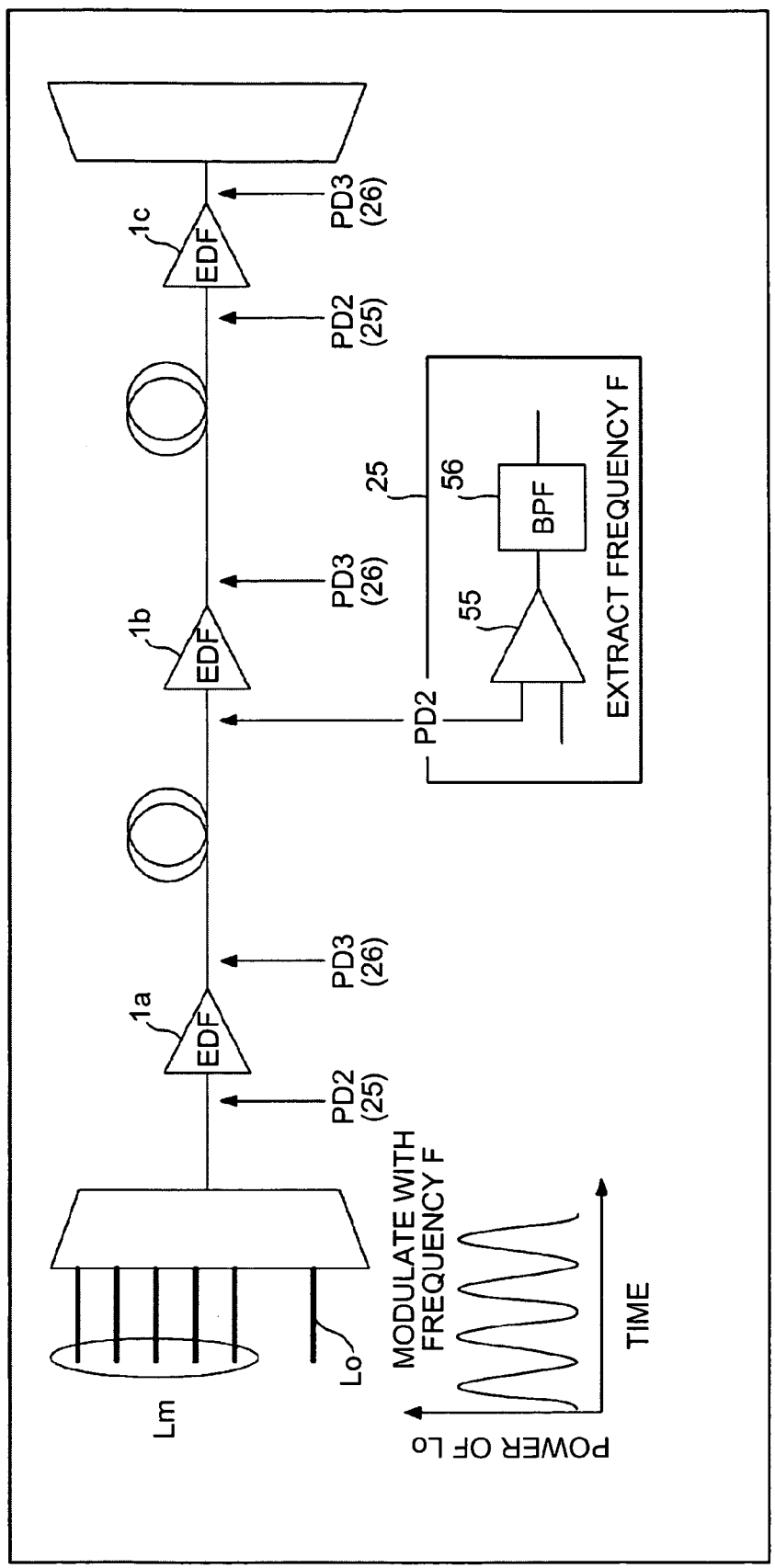
FIG. 11 is a schematic for illustrating frequency modulation of the loss monitoring light.

FIG. 11 is a schematic for illustrating frequency modulation of the loss monitoring light. In the light source of the loss monitoring light Lo (e.g., the LD for monitoring light 24 shown in FIG. 1), the loss monitoring light Lo is modulated at a specific frequency f. In the devices 1a to 1c that are monitoring points, after amplifying the loss monitoring light Lo with operational amplifier 55, the modulating frequency f is extracted by the Band-Pass Filter (BPF) 56 or the like to detect the loss monitoring light Lo in the PDs 2 and 3 (the PDs 25 and 26 shown in FIG. 1).

According to such a configuration, it is possible to control a noise level of a DC component of the loss monitoring light Lo and detect the loss monitoring light Lo even at a low input level. It is also possible to transmit the loss monitoring light Lo in a long distance. Alternatively, it is possible to make the optical amplifier 50 for the loss monitoring light Lo unnecessary and transmits the loss monitoring light Lo in a relatively long distance without optically amplifying the loss monitoring light Lo. In particular, the configuration is suitably used in a basic configuration of the second embodiment for transmitting one loss monitoring light Lo to the transmission path and performing control for a loss in each of a plurality of devices.

According to the second embodiment explained above, it is possible to reduce the number of light sources that generate loss monitoring light in an entire optical transmission system. Even if an optical amplifier itself does not generate loss monitoring light, it is possible to compensate for a loss that occurs in the optical amplifier at low cost using loss monitoring light inputted from the outside.

In a third embodiment of the present invention, when a plurality of optical amplifiers are provided in one station, a downstream optical amplification unit, which has generated an alarm, requests an upstream optical amplification unit to control output power and the like.

Figure 21:
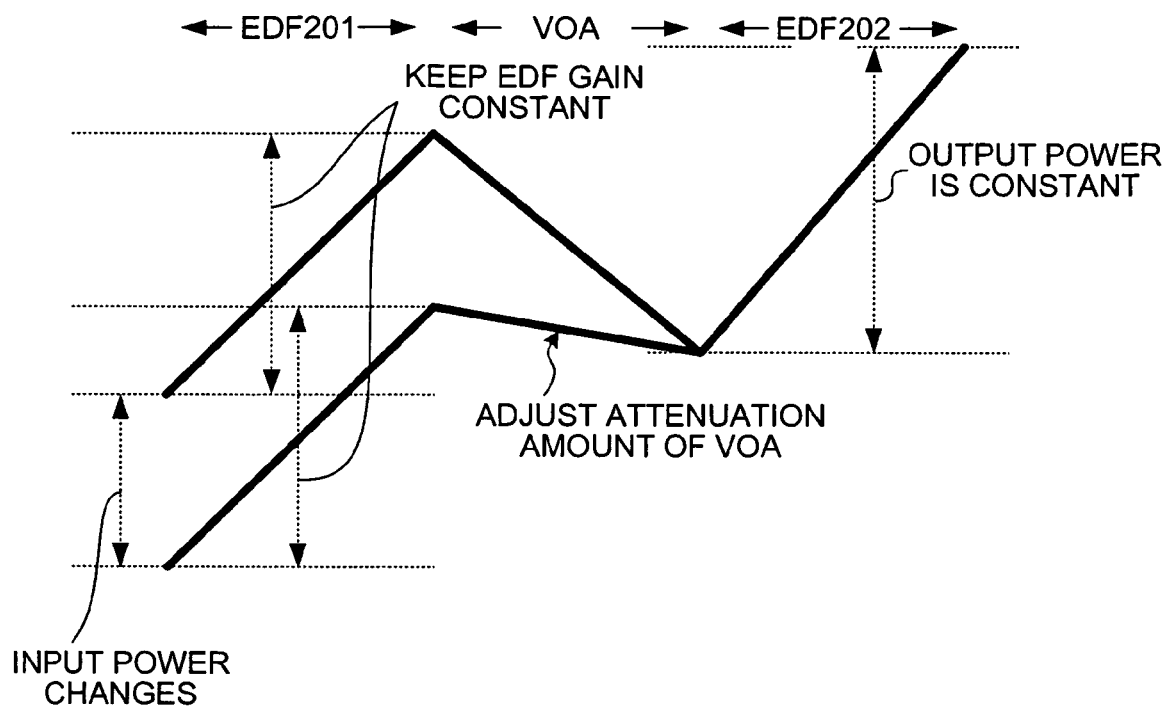
FIG. 21 is a schematic for illustrating control for keeping tilt constant.

When a loss of a certain optical amplifier increases and the optical amplifier generates an alarm, if it is possible to increase an input level to the optical amplifier that has generated the alarm, a margin for an amount of attenuation by a VOA is generated because of the increased input level. Thus, it is possible to prevent occurrence of tilt (see, for example, FIG. 21).

A function for notifying an optical amplification unit provided upstream of a state of generation of the alarm and an amount of increase in a necessary input level is provided in the optical amplification unit that has generated the alarm. The control unit 5 (see FIG. 1) has the function. The optical amplification unit, which receives the notice of generation of the alarm from the downstream optical amplification unit, increases output power and increases input power for an input to the downstream optical amplification unit during generation of the alarm. The input power is power for the light signal Lm. Consequently, it is possible to relax conditions for compensating for a loss (a compensation amount for a loss) applied to a VOA built in the optical amplification unit during generation of the alarm. In addition, it is possible to control deterioration in tilt (a fail safe function).

Figure 12:
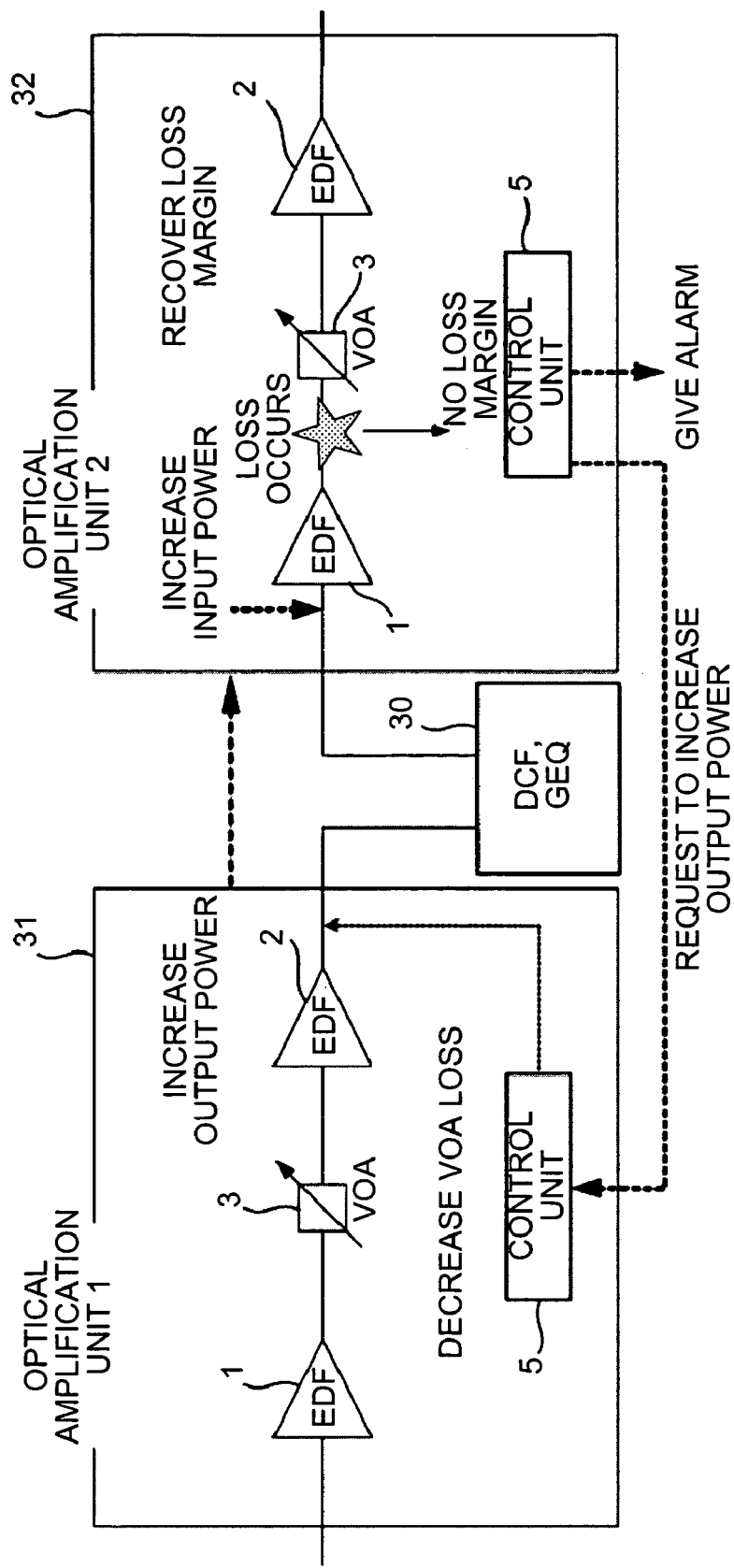
FIG. 12 is a schematic of an optical amplifier according to a third embodiment of the present invention.

Examples of the optical amplification unit arranged upstream include the following cases.

a. An upstream amplification unit in a plurality of stages of amplification units b. An optical amplification unit used with a Raman amplifier c. An EDF upstream a transmission path FIG. 12 is a schematic of an optical amplifier according to a third embodiment of the present invention. The optical amplifier shown in FIG. 12 has the same configuration as that shown in FIG. 6. An example of the configuration of a above is shown in FIG. 12. A function for notifying the optical amplification unit 1 (31) provided upstream of a state of generation of an alarm and an amount of increase in a necessary input level is provided in the optical amplification unit 2 (32) that has generated the alarm. The upstream optical amplification unit 1 (31), which receives the notice of generation of the alarm from the downstream optical amplification unit 2 (32), increases output power and increases input power of an input to the downstream optical amplification unit 2 (32) during generation of the alarm.

Procedures for control for the increase in output power are 1 to 3 described below.

1. Increase an output power set value of the upstream optical amplification unit 1 (31).

2. Since gains of the EDFs 1 and 2 in the upstream optical amplification unit 1 (31) are not changed, reduce a loss amount of the VOA 3 and increase a target value of the ALC to change output power.

3. Therefore, the control is executed in a range in which there is a margin in the loss amount of the VOA 3.

In the DCF and GEQ 30 connected to the output of the upstream optical amplifier 1 (31), to control a nonlinear effect, an upper limit of an input level may be determined. The increase in output power is executed within a range not exceeding an upper limit value of the input level.

Figure 13:
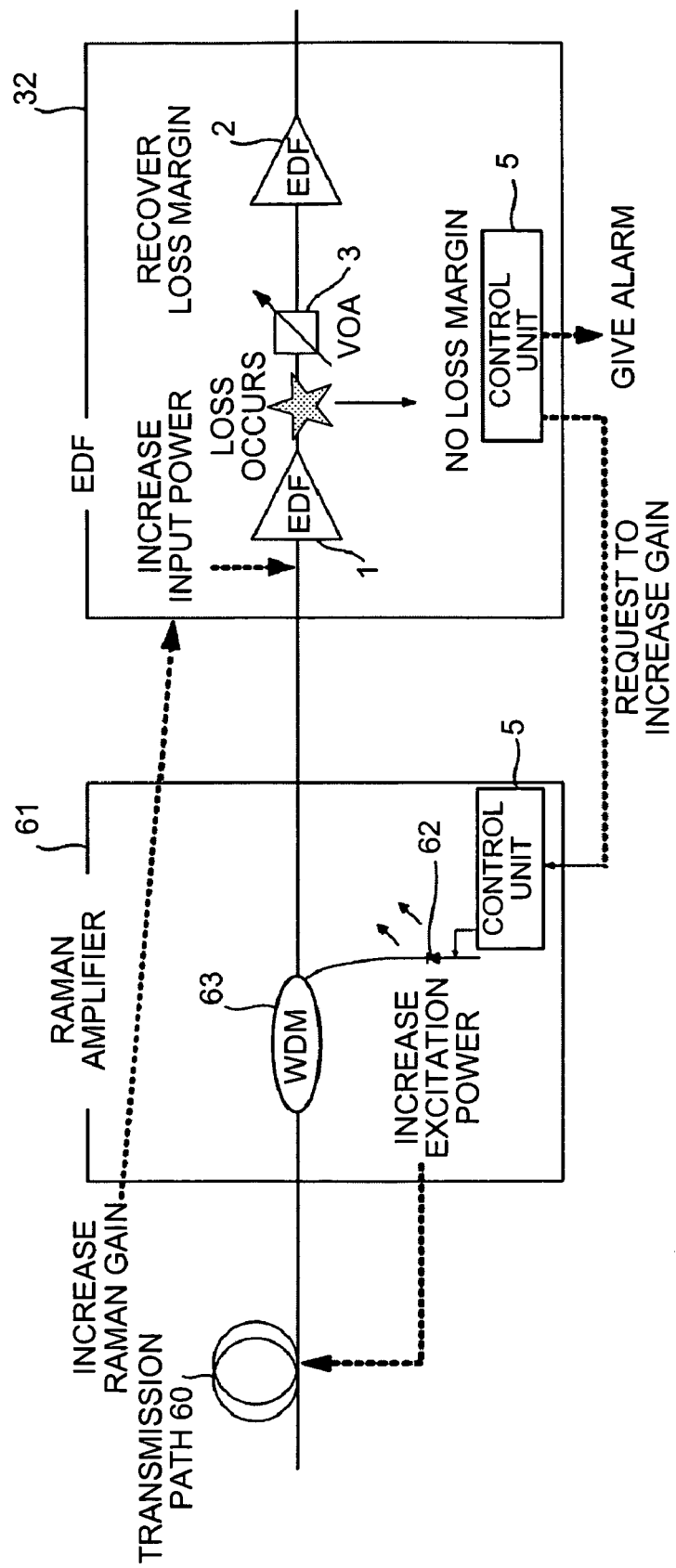
FIG. 13 is a schematic of an optical amplifier according to a third embodiment of the present invention.

FIG. 13 is another schematic of an optical amplifier according to a third embodiment of the present invention. An example of the configuration of b above is shown in FIG. 13. The optical amplifier uses both a Raman amplifier 61 and the EDF (the optical amplification unit 2 (32) shown in FIG. 12). The Raman amplifier 61 includes a Raman excitation LD 62 and a WDM coupler 63 that multiplexes excitation light of the Raman excitation LD 62 on a transmission path 60. The Raman amplifier 61 uses the transmission path 60 as a gain medium according to backward excitation.

In the case of the configuration shown in FIG. 13, at the time of a usual operation, a Raman gain, an input level of which is within an input dynamic range of the EDF 32, is set in the Raman amplifier 61. When an alarm is generated in the downstream EDF 32, a set value of the Raman gain is reset to a value that is increased because of the alarm. This makes it possible to increase input power of an input to the EDF 32.

Figure 14:
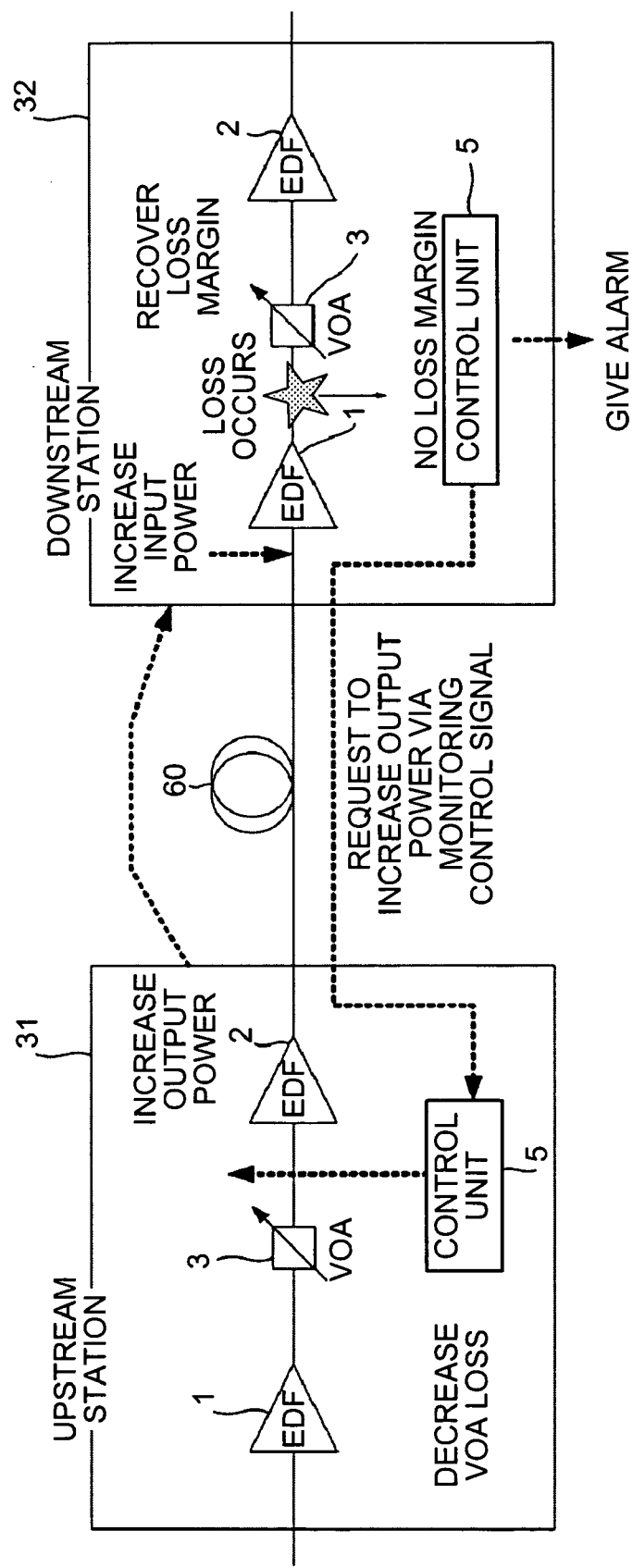
FIG. 14 is a schematic of an optical amplifier according to a third embodiment of the present invention.

FIG. 14 is another schematic of an optical amplifier according to a third embodiment of the present invention. An example of the configuration of c above is shown in FIG. 14. The downstream station (optical amplification unit) 32 notifies the upstream station (optical amplification unit) 31 of information on generation of an alarm using a monitoring control signal (OSC) via the transmission path 60. In the upstream station 31, output power is increased in the same procedure as a above (see FIG. 12). In such a configuration in FIG. 14, the increase in output power is also executed in a range in which there is a margin of the VOA 3. An upper limit of output power of output to the transmission path 60 is limited according to the nonlinear effect.

Note that, as a result of the increase in an input to the downstream optical amplification unit 32 during generation of the alarm according to the examples of the configuration of a to c, even if there is a margin for compensating for a loss in the VOA 3 provided in the downstream optical amplification unit 32, the downstream optical amplification unit 32 remains in a failure state. Thus, the downstream optical amplification unit 32 continues to give the alarm.

There may be no margin in compensation for a loss by the VOA 3 provided in the upstream optical amplification unit 31 or 61 that has received a request for an increase in output power from the downstream optical amplification unit 32. Even in this case, the upstream optical amplification unit 31 or 61 itself is not broken, the upstream optical amplification unit 31 or 61 masks the alarm given. Since the mask function is provided, it is possible to specify a broken portion. If the downstream optical amplification unit 32, which is the broken portion, is replaced, the request for an increase in output power of an output to the upstream optical amplification unit 31 or 61 is cancelled. The downstream optical amplification unit 32 can return to a normal operation state.

The configurations explained with reference to FIGS. 12 to 14 in the third embodiment are methods that are effective when an optical amplification unit is present upstream. However, in a multiplexing station including a first optical amplification unit after WDM multiplexing, since an upstream optical amplification unit is not present, it is impossible to apply the configurations.

Figure 15:
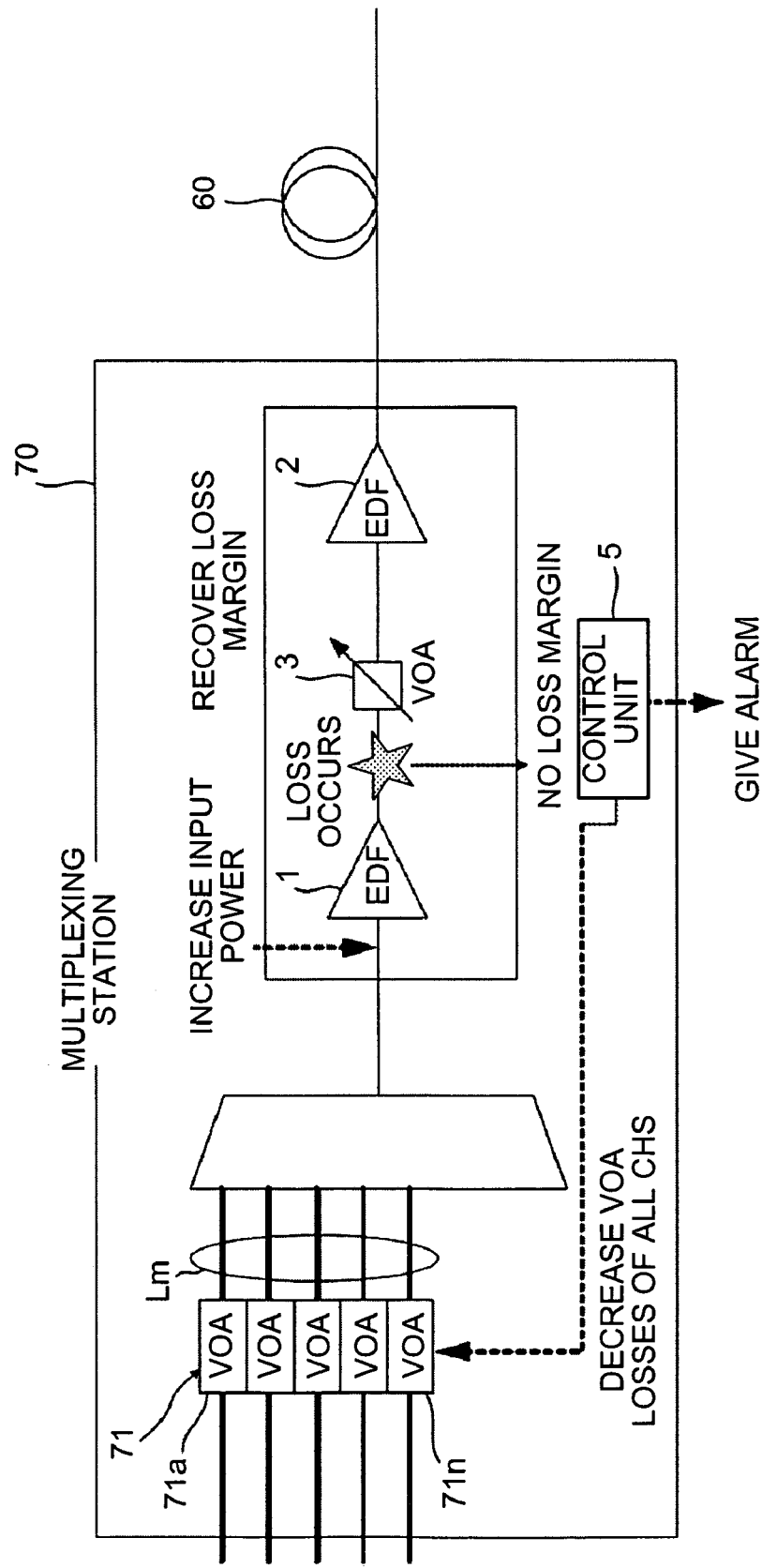
FIG. 15 is a schematic for illustrating compensation for a loss in a multiplexing station.

FIG. 15 is a schematic for illustrating compensation for a loss in a multiplexing station. In a multiplexing station 70, the optical amplification unit 32 is provided on a downstream side and a VOA 71 and a multiplexing unit 72 are provided on an upstream side. The VOA 71 includes a plurality of VOAs 71a to 71n to make it possible to change an attenuation amount for each wavelength before WDM multiplexing.

When an alarm is given to the VOAs 71 (71a to 71n) from the optical amplification unit 32 on the downstream side, the VOAs 71 change a target value for each wavelength and increase input power of an input to the optical amplification unit 32 individually. This makes it possible to relax limitation of compensation for a loss applied to the VOA 3 of the downstream optical amplification unit 32 that is generating the alarm.

Figure 16:
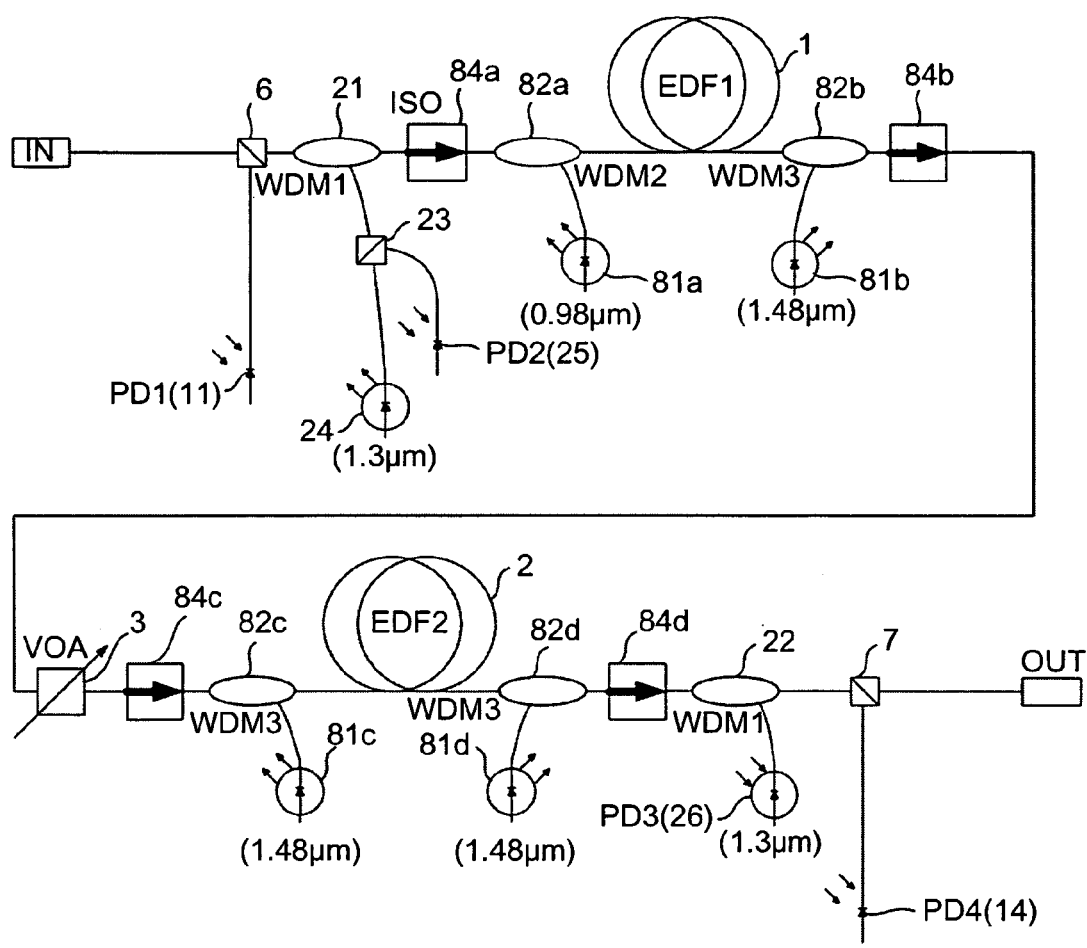
FIG. 16 is a schematic of a specific configuration of the optical amplifier shown in FIG. 1.

FIG. 16 is a schematic of a specific configuration of the optical amplifier shown in FIG. 1. The EDFs 1 and 2 on the transmission path are used as gain media. A semiconductor LD with a wavelength of 1.3 μm is used for the LD for monitoring light 24 that emits the loss monitoring light Lo.

A wavelength of 0.98 μh and a wavelength of 1.48 μm are used for excitation LDs 81 (81a to 81d) of the EDFs 1a and 2.

The excitation LDs 81 (81a to 81d) are connected to a path of the transmission path via WDM couplers 82 (82a to 82d), respectively. Isolators (ISOs) 84 (84a to 84d) are arranged at pre-stages and post-stages of pairs of WDM couplers 82 (82a and 82b, 82c and 82d) across the EDFs 1 and 2. In the example shown in FIG. 16, the two stages of EDFs 1 and 2 and the one stage of the VOA 3 are provided. However, the present invention is not limited to this configuration and is applicable to other configurations.

Figure 17:
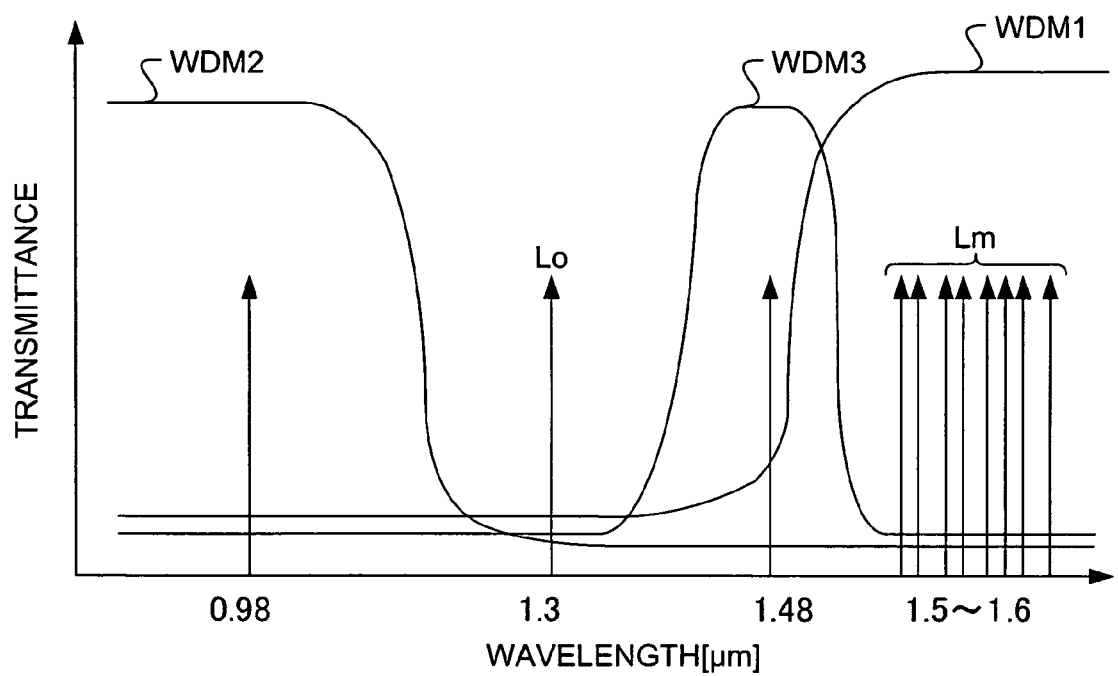
FIG. 17 is a schematic for illustrating a characteristic of a filter of a WDM coupler.
Figure 18:
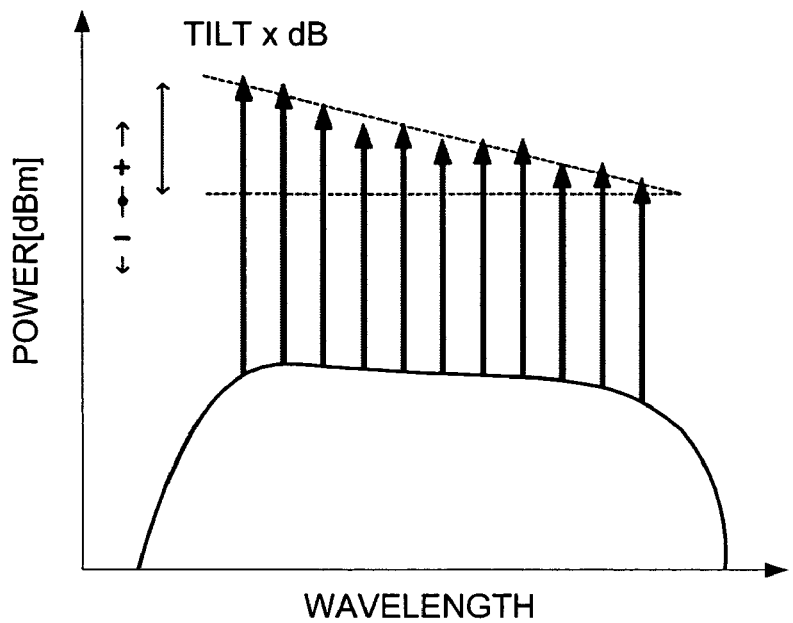
FIG. 18 is a schematic for illustrating tilt.
Figure 19:
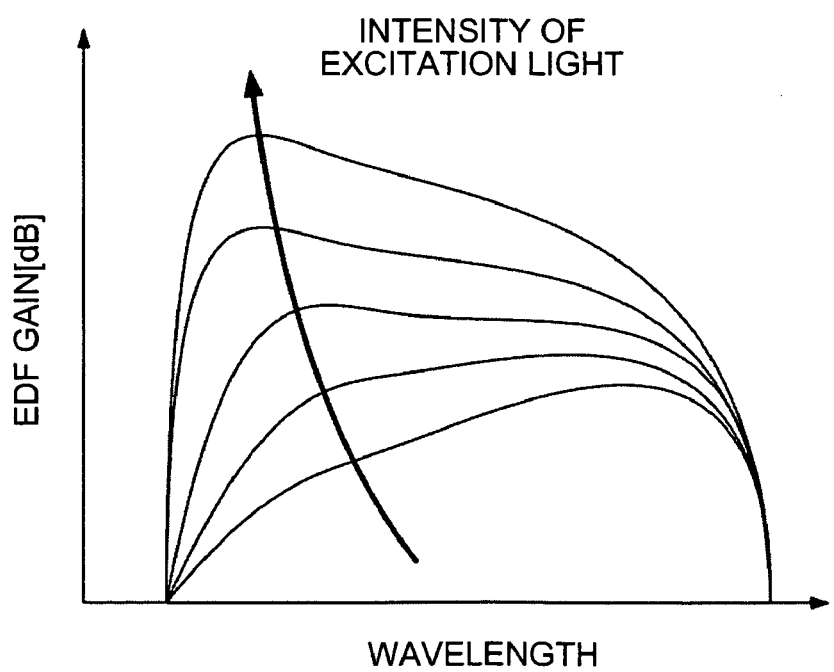
FIG. 19 is a schematic for illustrating a relation between excitation light and EDF gain.
Figure 20:
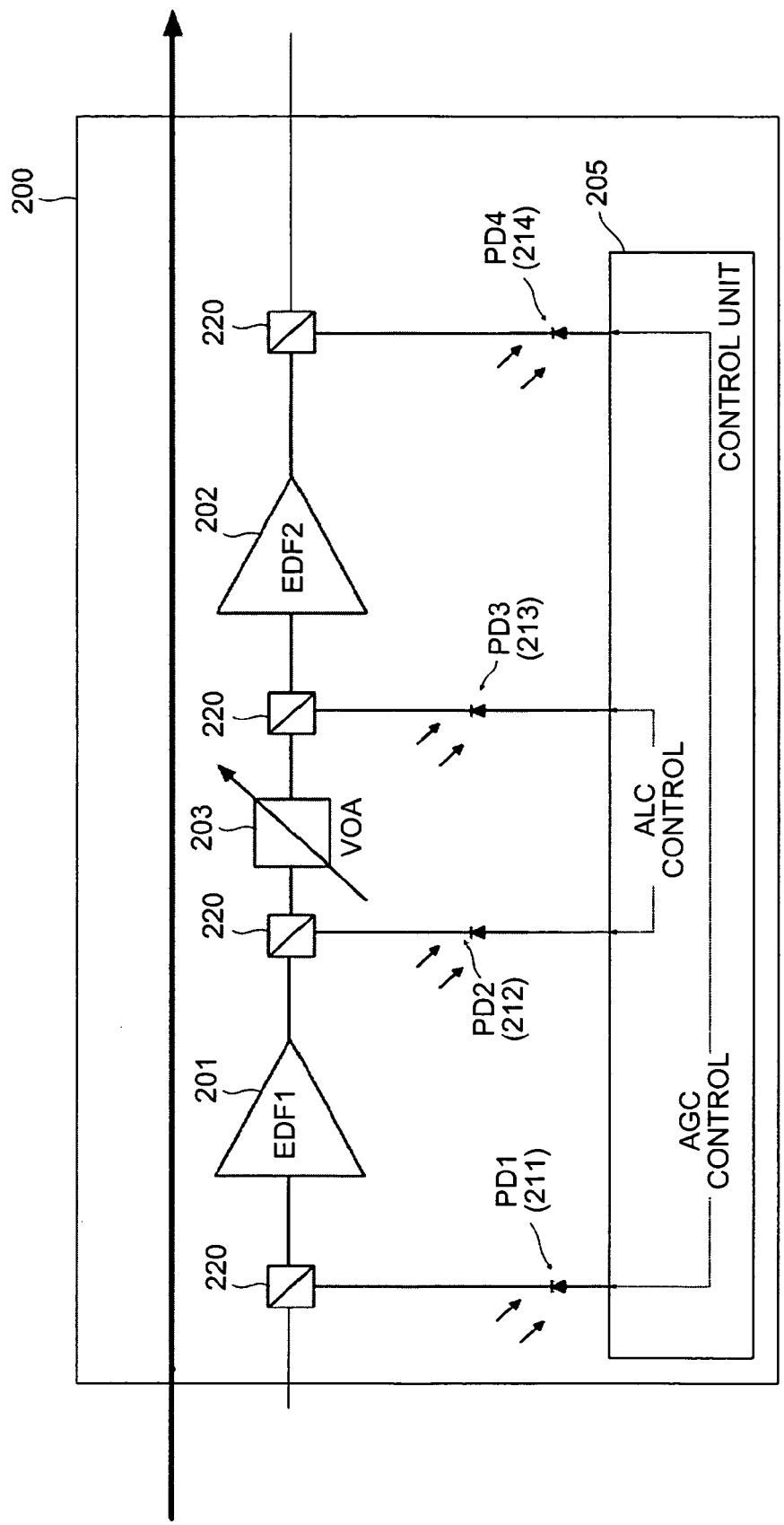
FIG. 20 is a schematic of a conventional optical amplifier.

FIG. 17 is a schematic for illustrating a characteristic of a filter of a WDM coupler used in the configuration shown in FIG. 16. An abscissa indicates a wavelength and an ordinate indicates transmittance. In the WDM 1 (21) that multiplexes and separates monitoring light and a light signal, since wavelengths of the monitoring light and the light signal are multiplexed, an LPF characteristic for separating a 1.3 μm band used for the loss monitoring light Lo and a 1.5 μm band used for the light signal Lm is adopted. In the WDM 2 (82a) for coupling excitation light of 0.98 μm to the EDF 1, since it is necessary to multiplex 0.98 μm of the excitation light while transmitting both the 1.3 μm band of the loss monitoring light Lo and the 1.5 μm band of the light signal Lm, an LPF characteristic separated between 0.98 μm and 1.3 μm is adopted.

In the WDMs 3 (82b to 82d) for coupling excitation light of 1.48 μm to the EDF 2, since the 1.3 μm band and the 1.55 μm band are transmitted and a 1.48 μm band between the bands is multiplexed, a characteristic of a Band-Pass filter (BPF) having a pass window in the part of 1.48 μm is adopted.

According to the embodiments described above, it is possible to realize amplification of a signal with high quality and high stabilization using an optical amplifier that includes an optical fiber doped with rare earth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical amplifier including a plurality of optical fibers doped with rare earth and a variable optical attenuator that are arranged on a transmission path of a light signal to be amplified, the light signal having a plurality of wavelengths, the optical amplifier comprising:
    an output unit configured to output a loss monitoring light having a wavelength that causes neither absorption nor gain with respect to each of the wavelengths of the light signal;
    a multiplexing unit configured to multiplex the loss monitoring light with the light signal at an input stage at which the light signal is input to be amplified into the optical amplifier;
    a demultiplexing unit configured to demultiplex multiplexed loss monitoring light from multiplexed light signal at an output stage at which amplified light signal is to be output from the optical amplifier;
    a detecting unit configured to detect intensity of the loss monitoring light at the time of multiplexing with the light signal and intensity of the loss monitoring light demultiplexed from the light signal;
    a calculating unit configured to calculate, based on the intensities, a loss of the loss monitoring light that has occurred between the input stage and the output stage; and
    a control unit configured to control, based on the loss, the variable optical attenuator so that an amplification gain for each wavelength of the light signal becomes flat.

2. The optical amplifier according to claim 1, wherein the control unit is configured to control the variable optical attenuator to control an amount of tilt.

3. The optical amplifier according to claim 1, further comprising at least one optical component, wherein
    the control unit is configured to alert failure of the optical amplifier when a loss of the light signal occurring at the optical component is larger than a threshold.

4. The optical amplifier according to claim 1, wherein the optical amplifier is configured to be connectable to another optical amplifier through an optical component arranged on the transmission path.

5. The optical amplifier according to claim 1, wherein
    the output unit includes a laser diode, and
    the detecting unit is configured to detect the intensity of the loss monitoring light at the time of multiplexing with the light signal, by detecting back power of the laser diode.

6. An optical amplifier for amplifying a light signal having a plurality of wavelengths, the optical amplifier comprising:
    a multiplexing unit configured to multiplex a loss monitoring light with the light signal before the light signal is input into the amplifier, wherein the loss monitoring light is set so as not to cause neither absorption nor gain with respect to each of the wavelengths of the light signal;
    a plurality of amplifiers each of which includes
        a plurality of optical fibers doped with rare earth arranged on a transmission path of the light signal;
        a variable optical attenuator arranged on the transmission path;
        a demultiplexing unit configured to demultiplex multiplexed loss monitoring light from the light signal at an output stage at which amplified signal light is to be output from the amplifier;
        a detecting unit configured to detect intensity of the loss monitoring light at the time of multiplexing with the light signal and intensity of the loss monitoring light demultiplexed from the light signal;
        a calculating unit configured to calculate, based on the intensities, a loss of the loss monitoring light that has occurred while the loss monitoring light passing through the amplifier; and
        a control unit configured to control, based on the loss, the variable optical attenuator so that an amplification gain for each wavelength of the light signal becomes flat.

7. The optical amplifier according to claim 6, further comprising an amplifying unit configured to amplify only the loss monitoring light, wherein
    the amplifying unit is arranged at a portion at which power of the loss monitoring light falls on the transmission path.

8. The optical amplifier according to claim 6, wherein
    the amplifier includes at least one optical component,
    the control unit is configured to generate an alarm signal, when a loss of the light signal occurring at the optical component is larger than a threshold.

9. The optical amplifier according to claim 8, wherein
the amplifier is configured to transmit the alarm signal when there is a second amplifier arranged downstream of the transmission path, and the second amplifier is configured to mask an alarm signal that is generated by the second amplifier when the second amplifier receives the alarm signal from the amplifier arranged upstream of the transmission path.

10. The optical amplifier according to claim 6, wherein
the loss monitoring light is modulated with a predetermined frequency, and the detecting unit is configured to detect the loss monitoring light based on the predetermined frequency.

11. The optical amplifier according to claim 6, wherein
the amplifier includes at least one optical component, the control unit is configured to request, when a loss of the light signal occurring at the optical component is larger than a threshold, a third amplifier arranged upstream of the transmission path to increase power of the light signal.

12. The optical amplifier according to claim 6, further comprising a signal multiplexing unit configured to multiplex a plurality of light signals having different wavelengths, and including an attenuating unit configured to adjust, for each of the wavelengths, power of the light signals before multiplexing the light signals, wherein the attenuating unit is configured to adjust the power based on a target value, the amplifier includes at least one optical component, and the control unit is configured to change, when a loss of the light signal occurring at the optical component is larger than a threshold, the target value to increase power of the light signals input to a second amplifier arranged downstream of the transmission path.

13. A method of amplifying a light signal having a plurality of wavelengths using an amplifier including a plurality of optical fibers doped with rare earth and a variable optical attenuator that are arranged on a transmission path of the light signal, the method comprising:

outputting a loss monitoring light having a wavelength that causes neither absorption nor gain with respect to each of the wavelengths of the light signal;

multiplexing the loss monitoring light with the light signal at an input stage at which the light signal is input to be amplified into the optical amplifier;

demultiplexing multiplexed loss monitoring light from the light signal at an output stage at which amplified light signal is to be output from the optical amplifier;

detecting intensity of the loss monitoring light at the time of multiplexing with the light signal and intensity of the loss monitoring light demultiplexed from the light signal;

calculating, based on the intensities, a loss of the loss monitoring light that has occurred between the input stage and the output stage; and controlling, based on the loss, the variable optical attenuator so that an amplification gain for each wavelength of the light signal becomes flat.

14. A method of amplifying a light signal having a plurality of wavelengths using a plurality of amplifiers each of which includes a plurality of optical fibers doped with rare earth and a variable optical attenuator that are arranged on a transmission path of the light signal, the method comprising:

multiplexing a loss monitoring light with the light signal, wherein the loss monitoring light is set so as not to cause neither absorption nor gain with respect to each of the wavelengths of the light signal;

inputting the light signal multiplexed with the loss monitoring light into the amplifier;

demultiplexing multiplexed loss monitoring light from the light signal at an output stage at which amplified signal light is to be output from the amplifier;

detecting intensity of the loss monitoring light at the time of multiplexing with the light signal and intensity of the loss monitoring light demultiplexed from the light signal;

calculating, based on the intensities, a loss of the loss monitoring light that has occurred while passing through the amplifier; and controlling, based on the loss, the variable optical attenuator so that an amplification gain for each wavelength of the light signal becomes flat.

* * * * *